(12) United States Patent
Moses

(10) Patent No.: US 10,503,613 B1
(45) Date of Patent: Dec. 10, 2019

(54) EFFICIENT SERVING OF RESOURCES DURING SERVER UNAVAILABILITY

(71) Applicant: Amazon Technologies, Inc., Seattle, WA (US)

(72) Inventor: Jebaraj Moses, Coimbatore (IN)

(73) Assignee: Amazon Technologies, Inc., Seattle, WA (US)

( * ) Notice: Subject to any disclaimer, the term of this patent is extended or adjusted under 35 U.S.C. 154(b) by 122 days.

(21) Appl. No.: 15/494,382

(22) Filed: Apr. 21, 2017

(51) Int. Cl.
*G06F 11/00* (2006.01)
*G06F 11/20* (2006.01)
*H04L 12/911* (2013.01)

(52) U.S. Cl.
CPC ........ *G06F 11/2007* (2013.01); *H04L 47/746* (2013.01); *G06F 2201/85* (2013.01)

(58) Field of Classification Search
CPC . H04L 67/2852; H04L 41/5025; H04L 43/16; H04L 69/40; G06F 11/1458; G06F 11/1461; G06F 11/1448; G06F 16/958; G06F 2212/1032; G11C 11/406; G11C 11/40615
See application file for complete search history.

(56) References Cited

U.S. PATENT DOCUMENTS

| 5,063,500 A | 11/1991 | Shorter |
| 5,341,477 A | 8/1994 | Pitkin et al. |
| 5,459,837 A | 10/1995 | Caccavale |
| 5,611,049 A | 3/1997 | Pitts |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,905,248 A | 5/1999 | Russell et al. |
| 5,933,811 A | 8/1999 | Angles et al. |

(Continued)

FOREIGN PATENT DOCUMENTS

| CA | 2741 895 A1 | 5/2010 |
| CN | 1422468 A | 6/2003 |

(Continued)

OTHER PUBLICATIONS

International Search Report and Written Opinion in PCT/US2017/055156 dated Dec. 13, 2017.

(Continued)

*Primary Examiner* — Loan L. T. Truong
(74) *Attorney, Agent, or Firm* — Knobbe, Martens, Olson & Bear, LLP

(57) ABSTRACT

Systems and methods are provided for efficiently providing backup resources during server unavailability. Server unavailability includes server unresponsiveness and latency. The system and methods generate backup resources that can be provided to clients during server unavailability. The backup resources may be static versions of dynamically generated resources that rely on multiple services. The generation of backup resources can be prioritized based on a determination of the frequently accessed resources. During failure scenarios, the systems and methods can monitor and redirect traffic as needed to improve server recovery times.

20 Claims, 8 Drawing Sheets

(56) References Cited

U.S. PATENT DOCUMENTS

| | | | |
|---|---|---|---|
| 5,937,427 A | 8/1999 | Shinagawa et al. | |
| 5,974,454 A | 10/1999 | Apfel et al. | |
| 5,991,306 A | 11/1999 | Burns et al. | |
| 5,999,274 A | 12/1999 | Lee et al. | |
| 6,006,264 A | 12/1999 | Colby et al. | |
| 6,016,512 A | 1/2000 | Huitema | |
| 6,018,619 A | 1/2000 | Allard et al. | |
| 6,026,452 A | 2/2000 | Pitts | |
| 6,038,601 A | 3/2000 | Lambert et al. | |
| 6,052,718 A | 4/2000 | Gifford | |
| 6,078,960 A | 6/2000 | Ballard | |
| 6,085,234 A | 7/2000 | Pitts et al. | |
| 6,092,100 A | 7/2000 | Berstis et al. | |
| 6,098,096 A | 8/2000 | Tsirigotis et al. | |
| 6,108,703 A | 8/2000 | Leighton et al. | |
| 6,128,279 A | 10/2000 | O'Neil et al. | |
| 6,151,631 A | 11/2000 | Ansell et al. | |
| 6,157,942 A | 12/2000 | Chu et al. | |
| 6,167,438 A | 12/2000 | Yates et al. | |
| 6,167,446 A | 12/2000 | Lister et al. | |
| 6,173,316 B1 | 1/2001 | De Boor et al. | |
| 6,182,111 B1 | 1/2001 | Inohara et al. | |
| 6,182,125 B1 | 1/2001 | Borella et al. | |
| 6,185,598 B1 | 2/2001 | Farber et al. | |
| 6,192,051 B1 | 2/2001 | Lipman et al. | |
| 6,205,475 B1 | 3/2001 | Pitts | |
| 6,223,288 B1 | 4/2001 | Byrne | |
| 6,243,761 B1 | 6/2001 | Mogul et al. | |
| 6,275,496 B1 | 8/2001 | Burns et al. | |
| 6,286,043 B1 | 9/2001 | Cuomo et al. | |
| 6,286,084 B1 | 9/2001 | Wexler et al. | |
| 6,304,913 B1 | 10/2001 | Rune | |
| 6,324,580 B1 | 11/2001 | Jindal et al. | |
| 6,330,602 B1 | 12/2001 | Law et al. | |
| 6,338,082 B1 | 1/2002 | Schneider | |
| 6,345,308 B1 | 2/2002 | Abe | |
| 6,351,743 B1 | 2/2002 | DeArdo et al. | |
| 6,351,775 B1 | 2/2002 | Yu | |
| 6,363,411 B1 | 3/2002 | Dugan et al. | |
| 6,366,952 B2 | 4/2002 | Pitts | |
| 6,374,290 B1 | 4/2002 | Scharber et al. | |
| 6,377,257 B1 | 4/2002 | Borrel et al. | |
| 6,386,043 B1 | 5/2002 | Millins | |
| 6,389,532 B1 | 5/2002 | Gupta et al. | |
| 6,405,252 B1 | 6/2002 | Gupta et al. | |
| 6,408,360 B1 | 6/2002 | Chamberlain et al. | |
| 6,411,967 B1 | 6/2002 | Van Renesse | |
| 6,415,280 B1 | 7/2002 | Farber et al. | |
| 6,430,607 B1 | 8/2002 | Kavner | |
| 6,438,592 B1 | 8/2002 | Killian | |
| 6,442,165 B1 | 8/2002 | Sitaraman et al. | |
| 6,452,925 B1 | 9/2002 | Sistanizadeh et al. | |
| 6,457,047 B1 | 9/2002 | Chandra et al. | |
| 6,459,909 B1 | 10/2002 | Bilcliff et al. | |
| 6,473,804 B1 | 10/2002 | Kaiser et al. | |
| 6,484,143 B1 | 11/2002 | Swildens et al. | |
| 6,484,161 B1 | 11/2002 | Chipalkatti et al. | |
| 6,493,765 B1 | 12/2002 | Cunningham et al. | |
| 6,505,241 B2 | 1/2003 | Pitts | |
| 6,513,112 B1 | 1/2003 | Craig et al. | |
| 6,523,036 B1 | 2/2003 | Hickman et al. | |
| 6,529,910 B1 | 3/2003 | Fleskes | |
| 6,529,953 B1 | 3/2003 | Van Renesse | |
| 6,553,413 B1 | 4/2003 | Leighton et al. | |
| 6,560,610 B1 | 5/2003 | Eatherton et al. | |
| 6,611,873 B1 | 8/2003 | Kanehara | |
| 6,622,168 B1 | 9/2003 | Datta | |
| 6,643,357 B2 | 11/2003 | Lumsden | |
| 6,643,707 B1 | 11/2003 | Booth | |
| 6,654,807 B2 | 11/2003 | Farber et al. | |
| 6,658,462 B1 | 12/2003 | Dutta | |
| 6,665,706 B2 | 12/2003 | Kenner et al. | |
| 6,678,717 B1 | 1/2004 | Schneider | |
| 6,678,791 B1 | 1/2004 | Jacobs et al. | |
| 6,681,282 B1 | 1/2004 | Golden et al. | |
| 6,687,222 B1 * | 2/2004 | Albert | H04L 29/06 370/230 |
| 6,687,846 B1 | 2/2004 | Adrangi et al. | |
| 6,694,358 B1 | 2/2004 | Swildens et al. | |
| 6,697,805 B1 | 2/2004 | Choquier et al. | |
| 6,718,324 B2 | 4/2004 | Edlund et al. | |
| 6,724,770 B1 | 4/2004 | Van Renesse | |
| 6,732,237 B1 | 5/2004 | Jacobs et al. | |
| 6,754,699 B2 | 6/2004 | Swildens et al. | |
| 6,754,706 B1 | 6/2004 | Swildens et al. | |
| 6,757,708 B1 * | 6/2004 | Craig | G06F 16/9574 709/203 |
| 6,760,721 B1 | 7/2004 | Chasen et al. | |
| 6,769,031 B1 | 7/2004 | Bero | |
| 6,782,398 B1 | 8/2004 | Bahl | |
| 6,785,704 B1 | 8/2004 | McCanne | |
| 6,795,434 B1 | 9/2004 | Kumar et al. | |
| 6,799,214 B1 | 9/2004 | Li | |
| 6,804,706 B2 | 10/2004 | Pitts | |
| 6,810,291 B2 | 10/2004 | Card et al. | |
| 6,810,411 B1 | 10/2004 | Coughlin et al. | |
| 6,829,654 B1 | 12/2004 | Jungck | |
| 6,850,975 B1 * | 2/2005 | Danneels | G06F 16/958 709/224 |
| 6,862,607 B1 | 3/2005 | Vermeulen | |
| 6,868,439 B2 | 3/2005 | Basu et al. | |
| 6,874,017 B1 | 3/2005 | Inoue et al. | |
| 6,917,951 B2 | 7/2005 | Orbits et al. | |
| 6,925,499 B1 | 8/2005 | Chen et al. | |
| 6,928,467 B2 | 8/2005 | Peng et al. | |
| 6,928,485 B1 | 8/2005 | Krishnamurthy et al. | |
| 6,941,562 B2 | 9/2005 | Gao et al. | |
| 6,950,848 B1 | 9/2005 | Yousefi'zadeh et al. | |
| 6,961,783 B1 | 11/2005 | Cook et al. | |
| 6,963,850 B1 | 11/2005 | Bezos et al. | |
| 6,976,090 B2 | 12/2005 | Ben-Shaul et al. | |
| 6,981,017 B1 | 12/2005 | Kasriel et al. | |
| 6,985,945 B2 | 1/2006 | Farhat et al. | |
| 6,986,018 B2 | 1/2006 | O'Rourke et al. | |
| 6,990,526 B1 | 1/2006 | Zhu | |
| 6,996,616 B1 | 2/2006 | Leighton et al. | |
| 7,003,555 B1 | 2/2006 | Jungck | |
| 7,006,099 B2 | 2/2006 | Gut et al. | |
| 7,007,089 B2 | 2/2006 | Freedman | |
| 7,010,578 B1 | 3/2006 | Lewin et al. | |
| 7,010,598 B2 | 3/2006 | Sitaraman et al. | |
| 7,024,466 B2 | 4/2006 | Outten et al. | |
| 7,027,582 B2 | 4/2006 | Khello et al. | |
| 7,031,445 B2 | 4/2006 | Lumsden | |
| 7,032,010 B1 | 4/2006 | Swildens et al. | |
| 7,058,633 B1 | 6/2006 | Gnagy et al. | |
| 7,058,706 B1 | 6/2006 | Iyer et al. | |
| 7,058,953 B2 | 6/2006 | Willard et al. | |
| 7,065,587 B2 | 6/2006 | Huitema et al. | |
| 7,072,982 B2 | 7/2006 | Teodosiu et al. | |
| 7,076,633 B2 | 7/2006 | Tormasov et al. | |
| 7,082,476 B1 | 7/2006 | Cohen et al. | |
| 7,086,061 B1 | 8/2006 | Joshi et al. | |
| 7,092,505 B2 | 8/2006 | Allison et al. | |
| 7,092,997 B1 | 8/2006 | Kasriel et al. | |
| 7,096,266 B2 | 8/2006 | Lewin et al. | |
| 7,099,936 B2 | 8/2006 | Chase et al. | |
| 7,103,645 B2 | 9/2006 | Leighton et al. | |
| 7,114,160 B2 | 9/2006 | Suryanarayana et al. | |
| 7,117,262 B2 | 10/2006 | Bai et al. | |
| 7,133,905 B2 | 11/2006 | Dilley et al. | |
| 7,136,922 B2 | 11/2006 | Sundaram et al. | |
| 7,139,808 B2 | 11/2006 | Anderson et al. | |
| 7,139,821 B1 | 11/2006 | Shah et al. | |
| 7,143,169 B1 | 11/2006 | Champagne et al. | |
| 7,143,170 B2 | 11/2006 | Swildens et al. | |
| 7,146,560 B2 | 12/2006 | Dang et al. | |
| 7,149,809 B2 | 12/2006 | Barde et al. | |
| 7,152,118 B2 | 12/2006 | Anderson, IV et al. | |
| 7,162,539 B2 | 1/2007 | Garcie-Luna-Aceves | |
| 7,174,382 B2 | 2/2007 | Ramanathan et al. | |
| 7,185,046 B2 | 2/2007 | Ferstl et al. | |
| 7,185,063 B1 | 2/2007 | Kasriel et al. | |
| 7,185,084 B2 | 2/2007 | Sirivara et al. | |

(56) References Cited

U.S. PATENT DOCUMENTS

| | | |
|---|---|---|
| 7,188,214 B1 | 3/2007 | Kasriel et al. |
| 7,193,918 B2 * | 3/2007 | Harrand ................ G11C 11/406 365/201 |
| 7,194,522 B1 | 3/2007 | Swildens et al. |
| 7,194,552 B1 | 3/2007 | Schneider |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,249,196 B1 | 7/2007 | Peiffer et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,272,227 B1 | 9/2007 | Beran |
| 7,274,658 B2 | 9/2007 | Bornstein et al. |
| 7,284,056 B2 | 10/2007 | Ramig |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,318,074 B2 | 1/2008 | Iyengar et al. |
| 7,320,131 B1 | 1/2008 | O'Toole, Jr. |
| 7,321,918 B2 | 1/2008 | Burd et al. |
| 7,337,968 B2 | 3/2008 | Wilz, Sr. et al. |
| 7,339,937 B2 | 3/2008 | Mitra et al. |
| 7,340,505 B2 | 3/2008 | Lisiecki et al. |
| 7,350,075 B1 | 3/2008 | Eastham et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,372,809 B2 | 5/2008 | Chen |
| 7,373,416 B2 | 5/2008 | Kagan et al. |
| 7,376,716 B2 | 5/2008 | Dilley et al. |
| 7,376,736 B2 | 5/2008 | Sundaram et al. |
| 7,380,078 B2 | 5/2008 | Ikegaya et al. |
| 7,389,354 B1 | 6/2008 | Sitaraman et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,409,712 B1 | 8/2008 | Brooks et al. |
| 7,430,610 B2 | 9/2008 | Pace et al. |
| 7,441,045 B2 | 10/2008 | Skene et al. |
| 7,441,261 B2 | 10/2008 | Slater et al. |
| 7,451,230 B2 | 11/2008 | Corrado et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,506,034 B2 | 3/2009 | Coates et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,593,935 B2 | 9/2009 | Sullivan |
| 7,594,189 B1 | 9/2009 | Walker et al. |
| 7,596,619 B2 | 9/2009 | Leighton et al. |
| 7,603,439 B2 | 10/2009 | Dilley et al. |
| 7,613,815 B1 | 11/2009 | Prakash et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,647,329 B1 * | 1/2010 | Fischman ......... G06F 17/30094 707/999.1 |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,684,394 B1 | 3/2010 | Cutbill et al. |
| 7,685,109 B1 | 3/2010 | Ransil et al. |
| 7,685,251 B2 | 3/2010 | Houlihan et al. |
| 7,693,813 B1 | 4/2010 | Cao et al. |
| 7,693,959 B2 | 4/2010 | Leighton et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,783,727 B1 | 8/2010 | Foley et al. |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,853,719 B1 | 12/2010 | Cao et al. |
| 7,865,594 B1 | 1/2011 | Baumback et al. |
| 7,865,953 B1 | 1/2011 | Hsieh et al. |
| 7,873,065 B1 | 1/2011 | Mukerji et al. |
| 7,890,612 B2 | 2/2011 | Todd et al. |
| 7,890,989 B1 | 2/2011 | Hofrichter et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |

(56) References Cited

U.S. PATENT DOCUMENTS

| | | |
|---|---|---|
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B1 | 8/2011 | Leighton et al. |
| 7,996,535 B2 | 8/2011 | Auerbach |
| 8,000,724 B1 | 8/2011 | Rayburn et al. |
| 8,001,187 B2 | 8/2011 | Stochosky |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,042,054 B2 | 10/2011 | White et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,132,242 B1 | 3/2012 | Wu |
| 8,135,820 B2 | 3/2012 | Richardson et al. |
| 8,155,126 B1 | 4/2012 | Mao et al. |
| 8,156,199 B1 | 4/2012 | Hoche-Mong et al. |
| 8,156,243 B2 | 4/2012 | Richardson et al. |
| 8,161,184 B2 | 4/2012 | Sekar et al. |
| 8,175,863 B1 | 5/2012 | Ostermeyer et al. |
| 8,190,682 B2 | 5/2012 | Paterson-Jones et al. |
| 8,195,605 B2 | 6/2012 | Chellappa et al. |
| 8,195,837 B2 | 6/2012 | McCarthy et al. |
| 8,209,695 B1 | 6/2012 | Pruyne et al. |
| 8,224,971 B1 | 7/2012 | Miller et al. |
| 8,224,986 B1 | 7/2012 | Liskov et al. |
| 8,224,994 B1 | 7/2012 | Schneider |
| 8,234,403 B2 | 7/2012 | Richardson et al. |
| 8,239,530 B2 | 8/2012 | Sundaram et al. |
| 8,250,135 B2 | 8/2012 | Driesen et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,271,471 B1 | 9/2012 | Kamvar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,296,393 B2 | 10/2012 | Alexander et al. |
| 8,301,600 B1 | 10/2012 | Helmick et al. |
| 8,301,645 B1 | 10/2012 | Crook |
| 8,321,568 B2 | 11/2012 | Sivasubramanian et al. |
| 8,356,074 B1 | 1/2013 | Ehrlich et al. |
| 8,380,831 B2 | 2/2013 | Barber |
| 8,380,851 B2 | 2/2013 | McCarthy et al. |
| 8,392,928 B1 | 3/2013 | Forys et al. |
| 8,402,137 B2 | 3/2013 | Sivasuramanian et al. |
| 8,423,408 B2 | 4/2013 | Barnes et al. |
| 8,423,662 B1 * | 4/2013 | Weihl .............. G06F 9/505 709/238 |
| 8,433,749 B2 | 4/2013 | Wee et al. |
| 8,443,167 B1 | 5/2013 | Fallone et al. |
| 8,447,831 B1 | 5/2013 | Sivasubramanian et al. |
| 8,447,876 B2 | 5/2013 | Verma et al. |
| 8,452,745 B2 | 5/2013 | Ramakrishna |
| 8,452,874 B2 | 5/2013 | MacCarthaigh et al. |
| 8,463,877 B1 | 6/2013 | Richardson |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,876 B2 | 8/2013 | Goodman et al. |
| 8,521,880 B1 | 8/2013 | Richardson et al. |
| 8,521,885 B1 | 8/2013 | Richardson et al. |
| 8,521,908 B2 | 8/2013 | Holmes et al. |
| 8,526,405 B2 | 9/2013 | Curtis et al. |
| 8,527,639 B1 | 9/2013 | Liskov et al. |
| 8,527,645 B1 | 9/2013 | Proffit et al. |
| 8,527,658 B2 | 9/2013 | Holmes et al. |
| 8,543,784 B1 * | 9/2013 | Clifford .............. G06F 11/1458 711/162 |
| 8,549,646 B2 | 10/2013 | Stavrou et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,612,565 B2 | 12/2013 | Schneider |
| 8,615,549 B2 | 12/2013 | Knowles et al. |
| 8,619,780 B1 | 12/2013 | Brandwine |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,645,700 B2 | 2/2014 | Smith et al. |
| 8,676,918 B2 | 3/2014 | Richardson et al. |
| 8,683,023 B1 | 3/2014 | Brandwine et al. |
| 8,683,076 B2 | 3/2014 | Farber et al. |
| 8,688,837 B1 | 4/2014 | Richardson et al. |
| 8,712,950 B2 | 4/2014 | Smith et al. |
| 8,732,309 B1 | 5/2014 | Richardson et al. |
| 8,745,177 B1 | 6/2014 | Kazerani et al. |
| 8,756,322 B1 * | 6/2014 | Lynch ................. H04L 47/62 709/226 |
| 8,756,325 B2 | 6/2014 | Sivasubramanian et al. |
| 8,756,341 B1 | 6/2014 | Richardson et al. |
| 8,775,553 B2 | 7/2014 | Cansino et al. |
| 8,782,236 B1 | 7/2014 | Marshall et al. |
| 8,782,279 B2 | 7/2014 | Eggleston et al. |
| 8,812,727 B1 | 8/2014 | Sorenson, III et al. |
| 8,813,141 B2 * | 8/2014 | Ramakrishnan ....... H04N 7/162 725/94 |
| 8,819,283 B2 | 8/2014 | Richardson et al. |
| 8,826,032 B1 | 9/2014 | Yahalom et al. |
| 8,904,009 B1 | 12/2014 | Marshall et al. |
| 8,914,514 B1 | 12/2014 | Jenkins et al. |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,935,744 B2 | 1/2015 | Osterweil et al. |
| 8,938,526 B1 | 1/2015 | Richardson et al. |
| 8,949,161 B2 | 2/2015 | Borst et al. |
| 8,949,459 B1 | 2/2015 | Scholl |
| 8,966,318 B1 | 2/2015 | Shah |
| 8,972,580 B2 | 3/2015 | Fleischman et al. |
| 9,003,035 B1 | 4/2015 | Richardson et al. |
| 9,003,040 B2 | 4/2015 | MacCarthaigh et al. |
| 9,009,286 B2 | 4/2015 | Sivasubramanian et al. |
| 9,009,334 B1 | 4/2015 | Jenkins et al. |
| 9,021,127 B2 | 4/2015 | Richardson et al. |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 | 5/2015 | Taylor et al. |
| 9,075,777 B1 | 7/2015 | Pope et al. |
| 9,075,893 B1 | 7/2015 | Jenkins |
| 9,083,675 B2 | 7/2015 | Richardson et al. |
| 9,083,743 B1 | 7/2015 | Patel et al. |
| 9,106,701 B2 | 8/2015 | Richardson et al. |
| 9,116,803 B1 | 8/2015 | Agrawal et al. |
| 9,130,756 B2 | 9/2015 | Richardson et al. |
| 9,130,977 B2 | 9/2015 | Zisapel et al. |
| 9,137,302 B1 | 9/2015 | Makhijani et al. |
| 9,154,551 B1 | 10/2015 | Watson |
| 9,160,703 B2 | 10/2015 | Richardson et al. |
| 9,172,674 B1 | 10/2015 | Patel et al. |
| 9,176,894 B2 | 11/2015 | Marshall et al. |
| 9,185,012 B2 | 11/2015 | Richardson et al. |
| 9,191,338 B2 | 11/2015 | Richardson et al. |

(56) References Cited

U.S. PATENT DOCUMENTS

| | | |
|---|---|---|
| 9,191,458 B2 | 11/2015 | Richardson et al. |
| 9,195,996 B1 | 11/2015 | Walsh et al. |
| 9,208,097 B2 | 12/2015 | Richardson et al. |
| 9,210,235 B2 | 12/2015 | Sivasubramanian et al. |
| 9,219,686 B2 | 12/2015 | Hilt et al. |
| 9,237,087 B1 | 1/2016 | Risbood et al. |
| 9,237,114 B2 | 1/2016 | Richardson et al. |
| 9,240,954 B1 | 1/2016 | Ellsworth et al. |
| 9,246,776 B2 | 1/2016 | Ellsworth et al. |
| 9,251,112 B2 | 2/2016 | Richardson et al. |
| 9,253,065 B2 | 2/2016 | Richardson et al. |
| 9,276,812 B1 | 3/2016 | Nagargadde et al. |
| 9,294,391 B1 | 3/2016 | Mostert |
| 9,323,577 B2 | 4/2016 | Marr et al. |
| 9,332,078 B2 | 5/2016 | Sivasubramanian et al. |
| 9,386,038 B2 | 7/2016 | Martini |
| 9,391,949 B1 | 7/2016 | Richardson et al. |
| 9,407,676 B2 | 8/2016 | Archer et al. |
| 9,407,681 B1 | 8/2016 | Richardson et al. |
| 9,407,699 B2 | 8/2016 | Sivasubramanian et al. |
| 9,444,718 B2 | 9/2016 | Khakpour et al. |
| 9,444,759 B2 | 9/2016 | Richardson et al. |
| 9,479,476 B2 | 10/2016 | Richardson et al. |
| 9,495,338 B1 | 11/2016 | Hollis et al. |
| 9,497,259 B1 | 11/2016 | Richardson et al. |
| 9,515,949 B2 | 12/2016 | Richardson et al. |
| 9,525,659 B1 | 12/2016 | Sonkin et al. |
| 9,544,394 B2 | 1/2017 | Richardson et al. |
| 9,571,389 B2 | 2/2017 | Richardson et al. |
| 9,584,328 B1 | 2/2017 | Graham-cumming |
| 9,590,946 B2 | 3/2017 | Richardson et al. |
| 9,608,957 B2 | 3/2017 | Sivasubramanian et al. |
| 9,621,660 B2 | 4/2017 | Sivasubramanian et al. |
| 9,628,509 B2 | 4/2017 | Holloway et al. |
| 9,628,554 B2 | 4/2017 | Marshall et al. |
| 9,645,808 B1 | 5/2017 | Turpie |
| 9,703,713 B2 | 7/2017 | Nadgowda |
| 9,705,922 B2 | 7/2017 | Foxhoven et al. |
| 9,712,325 B2 | 7/2017 | Richardson et al. |
| 9,712,484 B1 | 7/2017 | Richardson et al. |
| 9,734,472 B2 | 8/2017 | Richardson et al. |
| 9,742,795 B1 | 8/2017 | Radlein et al. |
| 9,760,420 B1 | 9/2017 | Letz et al. |
| 9,774,619 B1 | 9/2017 | Radlein et al. |
| 9,787,599 B2 | 10/2017 | Richardson et al. |
| 9,787,775 B1 | 10/2017 | Richardson et al. |
| 9,794,216 B2 | 10/2017 | Richardson et al. |
| 9,794,281 B1 | 10/2017 | Radlein et al. |
| 9,800,539 B2 | 10/2017 | Richardson et al. |
| 9,811,451 B1 | 11/2017 | Arguelles et al. |
| 9,819,567 B1 | 11/2017 | Uppal et al. |
| 9,832,141 B1 | 11/2017 | Raftery |
| 9,871,794 B2 | 1/2018 | Joffe et al. |
| 9,880,983 B2 * | 1/2018 | Botta ............ G06F 17/2288 |
| 9,887,914 B2 | 2/2018 | Bergman |
| 9,887,915 B2 | 2/2018 | Richardson et al. |
| 9,887,931 B1 | 2/2018 | Uppal et al. |
| 9,887,932 B1 | 2/2018 | Uppal et al. |
| 9,888,089 B2 | 2/2018 | Sivasubramanian et al. |
| 9,893,957 B2 | 2/2018 | Ellsworth et al. |
| 9,894,168 B2 | 2/2018 | Sivasubramanian et al. |
| 9,900,402 B1 | 2/2018 | Li et al. |
| 9,912,740 B2 | 3/2018 | Richardson et al. |
| 9,929,959 B2 | 3/2018 | Mostert |
| 9,930,131 B2 | 3/2018 | MacCarthaigh et al. |
| 9,954,934 B2 | 4/2018 | Sivasubramanian et al. |
| 9,985,927 B2 | 5/2018 | Richardson et al. |
| 9,992,086 B1 | 6/2018 | Mizik et al. |
| 9,992,303 B2 | 6/2018 | Richardson et al. |
| 10,015,237 B2 | 7/2018 | Richardson et al. |
| 10,015,241 B2 | 7/2018 | Marr et al. |
| 10,021,179 B1 | 7/2018 | Velummylum et al. |
| 10,027,582 B2 | 7/2018 | Richardson et al. |
| 10,033,627 B1 | 7/2018 | Howard et al. |
| 10,033,691 B1 | 7/2018 | Mizik et al. |
| 10,033,699 B2 | 7/2018 | Sullivan et al. |
| 10,049,051 B1 | 8/2018 | Baldwin |
| 10,075,551 B1 | 9/2018 | Baldwin et al. |
| 10,079,742 B1 | 9/2018 | Richardson et al. |
| 10,091,096 B1 | 10/2018 | Howard et al. |
| 10,097,398 B1 | 10/2018 | Richardson et al. |
| 10,097,448 B1 | 10/2018 | Howard et al. |
| 10,097,566 B1 | 10/2018 | Radlein et al. |
| 10,110,694 B1 | 10/2018 | Watson et al. |
| 10,116,584 B2 | 10/2018 | Richardson et al. |
| 10,135,620 B2 | 11/2018 | Richardson et al. |
| 10,157,135 B2 | 12/2018 | Richardson et al. |
| 10,158,729 B2 | 12/2018 | Sivasubramanian et al. |
| 10,162,753 B2 | 12/2018 | Marshall et al. |
| 10,180,993 B2 | 1/2019 | Raftery |
| 10,200,402 B2 | 2/2019 | Radlein et al. |
| 10,200,492 B2 | 2/2019 | MacCarthaigh et al. |
| 10,205,698 B1 | 2/2019 | Petersen et al. |
| 10,218,584 B2 | 2/2019 | Ellsworth et al. |
| 10,225,322 B2 | 3/2019 | Richardson et al. |
| 10,225,326 B1 | 3/2019 | Puchala et al. |
| 10,225,362 B2 | 3/2019 | Watson |
| 10,230,819 B2 | 3/2019 | Richardson et al. |
| 10,257,307 B1 | 4/2019 | Baldwin |
| 10,264,062 B2 | 4/2019 | Richardson et al. |
| 10,270,878 B1 | 4/2019 | Uppal et al. |
| 10,305,797 B2 | 5/2019 | Richardson et al. |
| 2001/0000811 A1 | 5/2001 | May et al. |
| 2001/0025305 A1 | 9/2001 | Yoshiasa et al. |
| 2001/0027479 A1 | 10/2001 | Delaney et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0052016 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004816 A1 | 1/2002 | Vange et al. |
| 2002/0004846 A1 | 1/2002 | Garcia-Luna-Aceves et al. |
| 2002/0007413 A1 | 1/2002 | Garcia-Luna-Aceves et al. |
| 2002/0010783 A1 | 1/2002 | Primak et al. |
| 2002/0010798 A1 | 1/2002 | Ben-Shaul et al. |
| 2002/0035624 A1 | 3/2002 | Kim |
| 2002/0048269 A1 | 4/2002 | Hong et al. |
| 2002/0049608 A1 | 4/2002 | Hartsell et al. |
| 2002/0049842 A1 | 4/2002 | Huetsch et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0065910 A1 | 5/2002 | Dutta |
| 2002/0066033 A1 * | 5/2002 | Dobbins ............ G06Q 30/0277 726/4 |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0083178 A1 | 6/2002 | Brothers |
| 2002/0083198 A1 | 6/2002 | Kim et al. |
| 2002/0087374 A1 | 7/2002 | Boubez et al. |
| 2002/0091786 A1 | 7/2002 | Yamaguchi et al. |
| 2002/0091801 A1 | 7/2002 | Lewin et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0103972 A1 | 8/2002 | Satran et al. |
| 2002/0107944 A1 | 8/2002 | Bai et al. |
| 2002/0112049 A1 | 8/2002 | Elnozahy et al. |
| 2002/0112123 A1 | 8/2002 | Becker et al. |
| 2002/0116481 A1 | 8/2002 | Lee |
| 2002/0116491 A1 | 8/2002 | Boyd et al. |
| 2002/0116582 A1 | 8/2002 | Copeland et al. |
| 2002/0120666 A1 | 8/2002 | Landsman et al. |
| 2002/0120782 A1 | 8/2002 | Dillon et al. |
| 2002/0124047 A1 | 9/2002 | Gartner et al. |
| 2002/0124098 A1 | 9/2002 | Shaw |

(56) References Cited

U.S. PATENT DOCUMENTS

| | | |
|---|---|---|
| 2002/0129123 A1 | 9/2002 | Johnson et al. |
| 2002/0131428 A1 | 9/2002 | Pecus et al. |
| 2002/0133741 A1 | 9/2002 | Maeda et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0138443 A1 | 9/2002 | Schran et al. |
| 2002/0138649 A1 | 9/2002 | Cartmell et al. |
| 2002/0143675 A1 | 10/2002 | Orshan |
| 2002/0143798 A1 | 10/2002 | Lisiecki et al. |
| 2002/0143989 A1 | 10/2002 | Huitema et al. |
| 2002/0145993 A1 | 10/2002 | Chowdhury et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0150276 A1 | 10/2002 | Chang |
| 2002/0152326 A1 | 10/2002 | Orshan |
| 2002/0154157 A1 | 10/2002 | Sherr et al. |
| 2002/0156884 A1 | 10/2002 | Bertram et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0184368 A1 | 12/2002 | Wang |
| 2002/0188722 A1 | 12/2002 | Banerjee et al. |
| 2002/0194324 A1 | 12/2002 | Guha |
| 2002/0194382 A1 | 12/2002 | Kausik et al. |
| 2002/0198953 A1 | 12/2002 | O'Rourke et al. |
| 2003/0002484 A1 | 1/2003 | Freedman |
| 2003/0004998 A1 | 1/2003 | Datta |
| 2003/0005036 A1 | 1/2003 | Mitzenmacher |
| 2003/0005111 A1 | 1/2003 | Allan |
| 2003/0007482 A1 | 1/2003 | Khello et al. |
| 2003/0009488 A1 | 1/2003 | Hart, III |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037108 A1 | 2/2003 | Peiffer et al. |
| 2003/0037139 A1 | 2/2003 | Shteyn |
| 2003/0037284 A1 | 2/2003 | Srinivasan et al. |
| 2003/0041094 A1 | 2/2003 | Lara et al. |
| 2003/0046343 A1 | 3/2003 | Krishnamurthy et al. |
| 2003/0065739 A1 | 4/2003 | Shnier |
| 2003/0070096 A1 | 4/2003 | Pazi et al. |
| 2003/0074401 A1 | 4/2003 | Connell et al. |
| 2003/0074471 A1 | 4/2003 | Anderson et al. |
| 2003/0074472 A1 | 4/2003 | Lucco et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0105829 A1 | 6/2003 | Hayward |
| 2003/0105857 A1 | 6/2003 | Kamen et al. |
| 2003/0110296 A1 * | 6/2003 | Kirsch ............... H04L 29/06 709/246 |
| 2003/0112792 A1 | 6/2003 | Cranor et al. |
| 2003/0120741 A1 | 6/2003 | Wu et al. |
| 2003/0126387 A1 | 7/2003 | Watanabe |
| 2003/0133554 A1 | 7/2003 | Nykanen et al. |
| 2003/0135467 A1 | 7/2003 | Okamoto |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0177321 A1 | 9/2003 | Watanabe |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |
| 2003/0204602 A1 | 10/2003 | Hudson et al. |
| 2003/0206520 A1 | 11/2003 | Wu et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2003/0236779 A1 | 12/2003 | Choi et al. |
| 2004/0003032 A1 | 1/2004 | Ma et al. |
| 2004/0010562 A1 | 1/2004 | Itonaga |
| 2004/0010563 A1 | 1/2004 | Forte et al. |
| 2004/0010588 A1 | 1/2004 | Slater et al. |
| 2004/0010601 A1 | 1/2004 | Afergan |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0032278 A1 | 2/2004 | Orii et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0054757 A1 | 3/2004 | Ueda et al. |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0068542 A1 | 4/2004 | Lalonde et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0105544 A1 | 6/2004 | Haneda et al. |
| 2004/0114579 A1 | 6/2004 | Karaoguz et al. |
| 2004/0117309 A1 | 6/2004 | Inoue et al. |
| 2004/0117455 A1 | 6/2004 | Kaminksy et al. |
| 2004/0128344 A1 | 7/2004 | Trossen |
| 2004/0128346 A1 | 7/2004 | Melamed et al. |
| 2004/0148520 A1 | 7/2004 | Talpade et al. |
| 2004/0167981 A1 | 8/2004 | Douglas et al. |
| 2004/0167982 A1 | 8/2004 | Cohen et al. |
| 2004/0170379 A1 | 9/2004 | Yao et al. |
| 2004/0172466 A1 | 9/2004 | Douglas et al. |
| 2004/0184456 A1 | 9/2004 | Binding et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0246948 A1 | 12/2004 | Lee et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0250119 A1 | 12/2004 | Shelest et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0015471 A1 | 1/2005 | Zhang et al. |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0039019 A1 | 2/2005 | Delany |

(56) References Cited

U.S. PATENT DOCUMENTS

| | | |
|---|---|---|
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108262 A1 | 5/2005 | Fawcett |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0147088 A1 | 7/2005 | Bao et al. |
| 2005/0149529 A1 | 7/2005 | Gutmans |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0172080 A1 | 8/2005 | Miyauchi |
| 2005/0174989 A1 | 8/2005 | Chen et al. |
| 2005/0181769 A1 | 8/2005 | Kogawa |
| 2005/0188073 A1 | 8/2005 | Nakamichi et al. |
| 2005/0192008 A1 | 9/2005 | Desai et al. |
| 2005/0192814 A1 | 9/2005 | Challener et al. |
| 2005/0198170 A1 | 9/2005 | LeMay et al. |
| 2005/0198200 A1 | 9/2005 | Subramanian et al. |
| 2005/0198303 A1 | 9/2005 | Knauerhase et al. |
| 2005/0198334 A1 | 9/2005 | Farber et al. |
| 2005/0198453 A1 | 9/2005 | Osaki |
| 2005/0198571 A1 | 9/2005 | Kramer et al. |
| 2005/0201302 A1 | 9/2005 | Gaddis et al. |
| 2005/0216483 A1 | 9/2005 | Armstrong et al. |
| 2005/0216569 A1 | 9/2005 | Coppola et al. |
| 2005/0216674 A1 | 9/2005 | Robbin et al. |
| 2005/0223095 A1 | 10/2005 | Volz et al. |
| 2005/0228856 A1 | 10/2005 | Swildens et al. |
| 2005/0229119 A1 | 10/2005 | Torvinen |
| 2005/0232165 A1 | 10/2005 | Brawn et al. |
| 2005/0234864 A1 | 10/2005 | Shapiro |
| 2005/0240574 A1 | 10/2005 | Challenger et al. |
| 2005/0256880 A1 | 11/2005 | Nam Koong et al. |
| 2005/0259645 A1 | 11/2005 | Chen et al. |
| 2005/0259672 A1 | 11/2005 | Eduri |
| 2005/0262248 A1 | 11/2005 | Jennings, III et al. |
| 2005/0266835 A1 | 12/2005 | Agrawal et al. |
| 2005/0267928 A1 | 12/2005 | Anderson et al. |
| 2005/0267937 A1 | 12/2005 | Daniels et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2005/0286564 A1 | 12/2005 | Hatley et al. |
| 2006/0005014 A1 | 1/2006 | Aura et al. |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0021001 A1 | 1/2006 | Giles et al. |
| 2006/0026067 A1 | 2/2006 | Nicholas et al. |
| 2006/0026154 A1 | 2/2006 | Altinel et al. |
| 2006/0031239 A1 | 2/2006 | Koenig |
| 2006/0031319 A1 | 2/2006 | Nelson et al. |
| 2006/0031503 A1 | 2/2006 | Gilbert |
| 2006/0034494 A1 | 2/2006 | Holloran |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0045005 A1 | 3/2006 | Blackmore et al. |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0070060 A1 | 3/2006 | Tantawi et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0106938 A1 | 5/2006 | Dini et al. |
| 2006/0107036 A1 | 5/2006 | Randle et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0129766 A1 | 6/2006 | Cassia et al. |
| 2006/0136453 A1 | 6/2006 | Kwan |
| 2006/0143293 A1 | 6/2006 | Freedman |
| 2006/0143442 A1 | 6/2006 | Smith |
| 2006/0146820 A1 | 7/2006 | Friedman et al. |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0165051 A1 | 7/2006 | Banerjee et al. |
| 2006/0168088 A1 | 7/2006 | Leighton et al. |
| 2006/0173957 A1 | 8/2006 | Robinson |
| 2006/0179080 A1 | 8/2006 | Meek et al. |
| 2006/0184936 A1 | 8/2006 | Abels et al. |
| 2006/0188097 A1 | 8/2006 | Taniguchi et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0198507 A1* | 9/2006 | Ishida .................. H04M 3/2227 379/221.09 |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0221971 A1 | 10/2006 | Andrieux et al. |
| 2006/0224752 A1 | 10/2006 | Parekh et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0230265 A1 | 10/2006 | Krishna |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0282629 A1* | 12/2006 | Stuart .................. G06F 17/30082 711/159 |
| 2006/0288119 A1 | 12/2006 | Kim et al. |
| 2006/0288424 A1 | 12/2006 | Saito |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043667 A1 | 2/2007 | Qawami et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0055765 A1 | 3/2007 | Lisiecki et al. |
| 2007/0061440 A1 | 3/2007 | Sundaram et al. |
| 2007/0064610 A1 | 3/2007 | Khandani |
| 2007/0076872 A1 | 4/2007 | Juneau |

(56) References Cited

U.S. PATENT DOCUMENTS

| | | |
|---|---|---|
| 2007/0086429 A1 | 4/2007 | Lawrence et al. |
| 2007/0094361 A1 | 4/2007 | Hoynowski et al. |
| 2007/0101061 A1 | 5/2007 | Baskaran et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156726 A1 | 7/2007 | Levy |
| 2007/0156919 A1 | 7/2007 | Potti et al. |
| 2007/0162331 A1 | 7/2007 | Sullivan |
| 2007/0168336 A1 | 7/2007 | Ransil et al. |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0233896 A1 | 10/2007 | Hilt et al. |
| 2007/0243860 A1 | 10/2007 | Aiello et al. |
| 2007/0244964 A1 | 10/2007 | Challenger et al. |
| 2007/0245022 A1 | 10/2007 | Olliphant et al. |
| 2007/0250467 A1 | 10/2007 | Mesnik et al. |
| 2007/0250468 A1 | 10/2007 | Pieper |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tal |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0271608 A1 | 11/2007 | Shimizu et al. |
| 2007/0280197 A1 | 12/2007 | Pearlman et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2007/0294419 A1 | 12/2007 | Ulevitch |
| 2008/0005057 A1 | 1/2008 | Ozzie et al. |
| 2008/0008089 A1 | 1/2008 | Bornstein et al. |
| 2008/0016233 A1 | 1/2008 | Schneider |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0049615 A1 | 2/2008 | Bugenhagen |
| 2008/0056207 A1 | 3/2008 | Eriksson et al. |
| 2008/0065724 A1 | 3/2008 | Seed et al. |
| 2008/0065745 A1 | 3/2008 | Leighton et al. |
| 2008/0066072 A1 | 3/2008 | Yurekli et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086434 A1 | 4/2008 | Chesla |
| 2008/0086559 A1 | 4/2008 | Davis et al. |
| 2008/0086574 A1 | 4/2008 | Raciborski et al. |
| 2008/0092242 A1 | 4/2008 | Rowley |
| 2008/0101358 A1 | 5/2008 | Van Ewijk et al. |
| 2008/0103805 A1 | 5/2008 | Shear et al. |
| 2008/0104268 A1 | 5/2008 | Farber et al. |
| 2008/0109679 A1 | 5/2008 | Wright et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155059 A1 | 6/2008 | Hardin et al. |
| 2008/0155061 A1 | 6/2008 | Afergan et al. |
| 2008/0155613 A1 | 6/2008 | Benya et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0222647 A1 | 9/2008 | Taylor et al. |
| 2008/0228574 A1 | 9/2008 | Stewart et al. |
| 2008/0228920 A1 | 9/2008 | Souders et al. |
| 2008/0235383 A1 | 9/2008 | Schneider |
| 2008/0235400 A1 | 9/2008 | Slocombe et al. |
| 2008/0256087 A1 | 10/2008 | Piironen et al. |
| 2008/0256175 A1 | 10/2008 | Lee et al. |
| 2008/0263135 A1 | 10/2008 | Olliphant |
| 2008/0270882 A1 | 10/2008 | Rollins et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0307175 A1* | 12/2008 | Hart ............... G06F 11/1461 711/162 |
| 2008/0312766 A1 | 12/2008 | Couckuyt |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0043900 A1 | 2/2009 | Barber |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0083279 A1 | 3/2009 | Hasek |
| 2009/0086728 A1 | 4/2009 | Gulati et al. |
| 2009/0086741 A1 | 4/2009 | Zhang |
| 2009/0089869 A1 | 4/2009 | Varghese |
| 2009/0094252 A1 | 4/2009 | Wong et al. |
| 2009/0103707 A1 | 4/2009 | McGary et al. |
| 2009/0106202 A1 | 4/2009 | Mizrahi |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132640 A1 | 5/2009 | Verma et al. |
| 2009/0132648 A1 | 5/2009 | Swildens et al. |
| 2009/0138533 A1 | 5/2009 | Iwasaki et al. |
| 2009/0138582 A1 | 5/2009 | Turk |
| 2009/0144411 A1 | 6/2009 | Winkler et al. |
| 2009/0144412 A1 | 6/2009 | Ferguson et al. |
| 2009/0150926 A1 | 6/2009 | Schlack |
| 2009/0157504 A1 | 6/2009 | Braemer et al. |
| 2009/0157850 A1 | 6/2009 | Gagliardi et al. |

(56) References Cited

U.S. PATENT DOCUMENTS

| | | |
|---|---|---|
| 2009/0158163 A1 | 6/2009 | Stephens et al. |
| 2009/0164331 A1 | 6/2009 | Bishop et al. |
| 2009/0164614 A1 | 6/2009 | Christian et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0198817 A1 | 8/2009 | Sundaram et al. |
| 2009/0204682 A1 | 8/2009 | Jeyaseelan et al. |
| 2009/0210549 A1 | 8/2009 | Hudson et al. |
| 2009/0228708 A1 | 9/2009 | Trostle |
| 2009/0233623 A1 | 9/2009 | Johnson |
| 2009/0241167 A1 | 9/2009 | Moore |
| 2009/0248697 A1 | 10/2009 | Richardson et al. |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1 | 10/2009 | Richardson et al. |
| 2009/0249222 A1 | 10/2009 | Schmidt et al. |
| 2009/0253435 A1 | 10/2009 | Olofsson |
| 2009/0254661 A1 | 10/2009 | Fullagar et al. |
| 2009/0259588 A1 | 10/2009 | Lindsay |
| 2009/0259971 A1 | 10/2009 | Rankine et al. |
| 2009/0262741 A1 | 10/2009 | Jungck et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0276771 A1 | 11/2009 | Nickolov et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1 | 12/2009 | Sivasubramanian et al. |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0020699 A1 | 1/2010 | On |
| 2010/0023601 A1 | 1/2010 | Lewin et al. |
| 2010/0023621 A1 | 1/2010 | Ezolt et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |
| 2010/0049862 A1 | 2/2010 | Dixon |
| 2010/0057894 A1 | 3/2010 | Glasser |
| 2010/0070603 A1 | 3/2010 | Moss et al. |
| 2010/0070700 A1 | 3/2010 | Borst et al. |
| 2010/0074268 A1 | 3/2010 | Raza |
| 2010/0082320 A1 | 4/2010 | Wood et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0095008 A1 | 4/2010 | Joshi |
| 2010/0100629 A1 | 4/2010 | Raciborski et al. |
| 2010/0103837 A1 | 4/2010 | Jungck et al. |
| 2010/0106934 A1 | 4/2010 | Calder et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125626 A1 | 5/2010 | Lucas et al. |
| 2010/0125673 A1 | 5/2010 | Richardson et al. |
| 2010/0125675 A1 | 5/2010 | Richardson et al. |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161564 A1 | 6/2010 | Lee et al. |
| 2010/0161565 A1 | 6/2010 | Lee et al. |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0174811 A1 | 7/2010 | Musiri et al. |
| 2010/0191854 A1 | 7/2010 | Isci et al. |
| 2010/0192225 A1 | 7/2010 | Ma et al. |
| 2010/0217801 A1 | 8/2010 | Leighton et al. |
| 2010/0217856 A1 | 8/2010 | Falkena |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0268814 A1 | 10/2010 | Cross et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0306382 A1 | 12/2010 | Cardosa et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0325365 A1 | 12/2010 | Colglazier et al. |
| 2010/0332595 A1 | 12/2010 | Fullagar et al. |
| 2011/0010244 A1 | 1/2011 | Hatridge |
| 2011/0016214 A1 | 1/2011 | Jackson |
| 2011/0029598 A1 | 2/2011 | Arnold et al. |
| 2011/0040893 A1 | 2/2011 | Karaoguz et al. |
| 2011/0051738 A1 | 3/2011 | Xu |
| 2011/0055386 A1 | 3/2011 | Middleton et al. |
| 2011/0055714 A1 | 3/2011 | Vemulapalli et al. |
| 2011/0055921 A1 | 3/2011 | Narayanaswamy et al. |
| 2011/0057790 A1 | 3/2011 | Martin et al. |
| 2011/0058675 A1 | 3/2011 | Brueck et al. |
| 2011/0072138 A1 | 3/2011 | Canturk et al. |
| 2011/0072366 A1 | 3/2011 | Spencer |
| 2011/0078000 A1 | 3/2011 | Ma et al. |
| 2011/0078230 A1 | 3/2011 | Sepulveda |
| 2011/0085654 A1 | 4/2011 | Jana et al. |
| 2011/0087769 A1 | 4/2011 | Holmes et al. |
| 2011/0096987 A1 | 4/2011 | Morales et al. |
| 2011/0106949 A1 | 5/2011 | Patel et al. |
| 2011/0113467 A1 | 5/2011 | Agarwal et al. |
| 2011/0125894 A1 | 5/2011 | Anderson et al. |
| 2011/0153938 A1 | 6/2011 | Verzunov et al. |
| 2011/0153941 A1 | 6/2011 | Spatscheck et al. |
| 2011/0154318 A1 | 6/2011 | Oshins et al. |
| 2011/0154350 A1 | 6/2011 | Doyle et al. |
| 2011/0161461 A1 | 6/2011 | Niven-Jenkins |
| 2011/0166935 A1 | 7/2011 | Armentrout et al. |
| 2011/0167108 A1* | 7/2011 | Chen ............ G06F 21/64 709/203 |
| 2011/0182290 A1 | 7/2011 | Perkins |
| 2011/0191445 A1 | 8/2011 | Dazzi |
| 2011/0191447 A1 | 8/2011 | Dazzi et al. |
| 2011/0191449 A1 | 8/2011 | Swildens et al. |
| 2011/0191459 A1 | 8/2011 | Joshi |
| 2011/0196892 A1 | 8/2011 | Xia |
| 2011/0208876 A1 | 8/2011 | Richardson et al. |
| 2011/0208958 A1 | 8/2011 | Stuedi et al. |
| 2011/0209064 A1 | 8/2011 | Jorgensen et al. |
| 2011/0219120 A1 | 9/2011 | Farber et al. |
| 2011/0219372 A1 | 9/2011 | Agarwal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0255445 A1 | 10/2011 | Johnson et al. |
| 2011/0258049 A1 | 10/2011 | Ramer et al. |
| 2011/0258614 A1 | 10/2011 | Tamm |
| 2011/0270964 A1 | 11/2011 | Huang et al. |
| 2011/0276623 A1 | 11/2011 | Girbal |

(56) References Cited

U.S. PATENT DOCUMENTS

| | | | |
|---|---|---|---|
| 2011/0283267 A1* | 11/2011 | Waite | G06F 11/3672 717/135 |
| 2011/0296053 A1 | 12/2011 | Medved et al. | |
| 2011/0296370 A1 | 12/2011 | Ferris et al. | |
| 2011/0302304 A1 | 12/2011 | Baumback et al. | |
| 2011/0307533 A1 | 12/2011 | Saeki | |
| 2011/0320522 A1 | 12/2011 | Endres et al. | |
| 2011/0320559 A1 | 12/2011 | Foti | |
| 2012/0011190 A1 | 1/2012 | Driesen et al. | |
| 2012/0023090 A1 | 1/2012 | Holloway et al. | |
| 2012/0023226 A1 | 1/2012 | Petersen et al. | |
| 2012/0036238 A1 | 2/2012 | Sundaram et al. | |
| 2012/0041970 A1 | 2/2012 | Ghosh et al. | |
| 2012/0047223 A1* | 2/2012 | Tarkoma | H04L 67/1097 709/217 |
| 2012/0066360 A1 | 3/2012 | Ghosh | |
| 2012/0072600 A1 | 3/2012 | Richardson et al. | |
| 2012/0072608 A1 | 3/2012 | Peters et al. | |
| 2012/0078998 A1 | 3/2012 | Son et al. | |
| 2012/0079096 A1 | 3/2012 | Cowan et al. | |
| 2012/0079115 A1* | 3/2012 | Richardson | H04L 29/12066 709/226 |
| 2012/0014249 A1 | 4/2012 | Mao et al. | |
| 2012/0089700 A1 | 4/2012 | Safruti et al. | |
| 2012/0089972 A1 | 4/2012 | Scheidel et al. | |
| 2012/0096065 A1 | 4/2012 | Suit et al. | |
| 2012/0096166 A1 | 4/2012 | Devarapalli et al. | |
| 2012/0110515 A1 | 5/2012 | Abramoff et al. | |
| 2012/0117621 A1 | 5/2012 | Kondamuru et al. | |
| 2012/0124184 A1 | 5/2012 | Sakata et al. | |
| 2012/0131177 A1 | 5/2012 | Brandt et al. | |
| 2012/0136697 A1 | 5/2012 | Peles et al. | |
| 2012/0142310 A1 | 6/2012 | Pugh et al. | |
| 2012/0143688 A1 | 6/2012 | Alexander | |
| 2012/0159476 A1 | 6/2012 | Ramteke et al. | |
| 2012/0166516 A1 | 6/2012 | Simmons et al. | |
| 2012/0169646 A1 | 7/2012 | Berkes et al. | |
| 2012/0173760 A1 | 7/2012 | Jog et al. | |
| 2012/0179796 A1 | 7/2012 | Nagaraj et al. | |
| 2012/0179817 A1 | 7/2012 | Bade et al. | |
| 2012/0179839 A1 | 7/2012 | Raciborski et al. | |
| 2012/0198043 A1 | 8/2012 | Hesketh et al. | |
| 2012/0198071 A1 | 8/2012 | Black et al. | |
| 2012/0209942 A1 | 8/2012 | Zehavi et al. | |
| 2012/0224516 A1 | 9/2012 | Stojanovski et al. | |
| 2012/0226649 A1 | 9/2012 | Kovacs et al. | |
| 2012/0233329 A1 | 9/2012 | Dickinson et al. | |
| 2012/0233522 A1 | 9/2012 | Barton et al. | |
| 2012/0233668 A1 | 9/2012 | Leafe et al. | |
| 2012/0239725 A1 | 9/2012 | Hartrick et al. | |
| 2012/0246129 A1 | 9/2012 | Rothschild et al. | |
| 2012/0246257 A1 | 9/2012 | Brown | |
| 2012/0254961 A1 | 10/2012 | Kim et al. | |
| 2012/0257628 A1 | 10/2012 | Bu et al. | |
| 2012/0259954 A1 | 10/2012 | McCarthy et al. | |
| 2012/0278229 A1 | 11/2012 | Vishwanathan et al. | |
| 2012/0278831 A1 | 11/2012 | van Coppenolle et al. | |
| 2012/0303785 A1 | 11/2012 | Sivasubramanian et al. | |
| 2012/0303804 A1 | 11/2012 | Sundaram et al. | |
| 2012/0311648 A1 | 12/2012 | Swildens et al. | |
| 2012/0324089 A1 | 12/2012 | Joshi | |
| 2013/0003547 A1 | 1/2013 | Motwani et al. | |
| 2013/0003735 A1 | 1/2013 | Chao et al. | |
| 2013/0007100 A1 | 1/2013 | Trahan et al. | |
| 2013/0007101 A1 | 1/2013 | Trahan et al. | |
| 2013/0007102 A1 | 1/2013 | Trahan et al. | |
| 2013/0007241 A1 | 1/2013 | Trahan et al. | |
| 2013/0007273 A1 | 1/2013 | Baumback et al. | |
| 2013/0018945 A1 | 1/2013 | Vendrow et al. | |
| 2013/0019311 A1 | 1/2013 | Swildens et al. | |
| 2013/0034099 A1 | 2/2013 | Hikichi et al. | |
| 2013/0041872 A1 | 2/2013 | Aizman et al. | |
| 2013/0046869 A1 | 2/2013 | Jenkins et al. | |
| 2013/0046883 A1 | 2/2013 | Lientz et al. | |
| 2013/0054675 A1 | 2/2013 | Jenkins et al. | |
| 2013/0055374 A1 | 2/2013 | Kustarz et al. | |
| 2013/0061054 A1* | 3/2013 | Niccolai | G06F 21/10 713/171 |
| 2013/0066951 A1* | 3/2013 | Agranat | H04J 14/0227 709/203 |
| 2013/0067530 A1 | 3/2013 | Spektor et al. | |
| 2013/0073808 A1 | 3/2013 | Puthalath et al. | |
| 2013/0080420 A1 | 3/2013 | Taylor et al. | |
| 2013/0080421 A1 | 3/2013 | Taylor et al. | |
| 2013/0080576 A1 | 3/2013 | Taylor et al. | |
| 2013/0080577 A1 | 3/2013 | Taylor et al. | |
| 2013/0080623 A1 | 3/2013 | Thireault | |
| 2013/0080627 A1 | 3/2013 | Kukreja et al. | |
| 2013/0080636 A1 | 3/2013 | Friedman et al. | |
| 2013/0086001 A1 | 4/2013 | Bhogal et al. | |
| 2013/0111035 A1 | 5/2013 | Alapati et al. | |
| 2013/0117282 A1 | 5/2013 | Mugali, Jr. et al. | |
| 2013/0117849 A1 | 5/2013 | Golshan et al. | |
| 2013/0130221 A1 | 5/2013 | Kortemeyer et al. | |
| 2013/0133057 A1 | 5/2013 | Yoon et al. | |
| 2013/0151646 A1 | 6/2013 | Chidambaram et al. | |
| 2013/0191499 A1 | 7/2013 | Ludin et al. | |
| 2013/0195420 A1* | 8/2013 | Biggs | H04N 9/8205 386/230 |
| 2013/0198341 A1 | 8/2013 | Kim | |
| 2013/0212300 A1 | 8/2013 | Eggleston et al. | |
| 2013/0219020 A1 | 8/2013 | McCarthy et al. | |
| 2013/0227165 A1 | 8/2013 | Liu | |
| 2013/0246567 A1 | 9/2013 | Green et al. | |
| 2013/0254269 A1 | 9/2013 | Sivasubramanian et al. | |
| 2013/0254879 A1 | 9/2013 | Chesla et al. | |
| 2013/0263256 A1 | 10/2013 | Dickinson et al. | |
| 2013/0268616 A1 | 10/2013 | Sakata et al. | |
| 2013/0275549 A1 | 10/2013 | Field et al. | |
| 2013/0279335 A1 | 10/2013 | Ahmadi | |
| 2013/0305046 A1 | 11/2013 | Mankovski et al. | |
| 2013/0311583 A1 | 11/2013 | Humphreys et al. | |
| 2013/0311605 A1 | 11/2013 | Richardson et al. | |
| 2013/0311989 A1 | 11/2013 | Ota et al. | |
| 2013/0339429 A1 | 12/2013 | Richardson et al. | |
| 2013/0346465 A1 | 12/2013 | Maltz et al. | |
| 2013/0346470 A1 | 12/2013 | Obstfeld et al. | |
| 2013/0346567 A1 | 12/2013 | Richardson et al. | |
| 2013/0346614 A1 | 12/2013 | Baughman et al. | |
| 2014/0006577 A1 | 1/2014 | Joe et al. | |
| 2014/0007239 A1 | 1/2014 | Sharpe et al. | |
| 2014/0013403 A1 | 1/2014 | Shuster | |
| 2014/0019605 A1 | 1/2014 | Boberg | |
| 2014/0022951 A1 | 1/2014 | Lemieux | |
| 2014/0036675 A1 | 2/2014 | Wang et al. | |
| 2014/0040478 A1 | 2/2014 | Hsu et al. | |
| 2014/0047104 A1 | 2/2014 | Rodriguez | |
| 2014/0053022 A1 | 2/2014 | Forgette et al. | |
| 2014/0059198 A1 | 2/2014 | Richardson et al. | |
| 2014/0059379 A1 | 2/2014 | Ren et al. | |
| 2014/0068106 A1* | 3/2014 | Turlington | H04L 41/0659 709/241 |
| 2014/0082165 A1 | 3/2014 | Marr et al. | |
| 2014/0082614 A1 | 3/2014 | Klein et al. | |
| 2014/0089917 A1 | 3/2014 | Attalla et al. | |
| 2014/0108672 A1 | 4/2014 | Ou et al. | |
| 2014/0122698 A1 | 5/2014 | Batrouni et al. | |
| 2014/0122725 A1 | 5/2014 | Batrouni et al. | |
| 2014/0137111 A1 | 5/2014 | Dees et al. | |
| 2014/0149601 A1 | 5/2014 | Carney et al. | |
| 2014/0164352 A1* | 6/2014 | Denninghoff | H03H 9/02622 707/711 |
| 2014/0164817 A1 | 6/2014 | Bartholomy et al. | |
| 2014/0165061 A1 | 6/2014 | Greene et al. | |
| 2014/0169281 A1* | 6/2014 | Wang | H04W 72/1226 370/329 |
| 2014/0195686 A1 | 7/2014 | Yeager et al. | |
| 2014/0200036 A1 | 7/2014 | Egner et al. | |
| 2014/0215019 A1 | 7/2014 | Ahrens | |
| 2014/0223427 A1* | 8/2014 | Bootland | G06F 8/61 718/1 |
| 2014/0244937 A1 | 8/2014 | Bloomstein et al. | |
| 2014/0257891 A1 | 9/2014 | Richardson et al. | |
| 2014/0269371 A1 | 9/2014 | Badea et al. | |

(56) References Cited

U.S. PATENT DOCUMENTS

| | | |
|---|---|---|
| 2014/0280606 A1 | 9/2014 | Long |
| 2014/0280679 A1 | 9/2014 | Dey et al. |
| 2014/0297866 A1 | 10/2014 | Ennaji et al. |
| 2014/0297870 A1 | 10/2014 | Eggleston et al. |
| 2014/0298021 A1 | 10/2014 | Kwon et al. |
| 2014/0310402 A1 | 10/2014 | Giaretta et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0351413 A1 | 11/2014 | Smith et al. |
| 2014/0351871 A1 | 11/2014 | Bomfim et al. |
| 2014/0358985 A1* | 12/2014 | Kotecha ............ H04L 65/1063 709/202 |
| 2015/0006615 A1 | 1/2015 | Wainner et al. |
| 2015/0019686 A1 | 1/2015 | Backholm |
| 2015/0026407 A1 | 1/2015 | Mclellan et al. |
| 2015/0067171 A1 | 3/2015 | Yum |
| 2015/0074228 A1 | 3/2015 | Drake |
| 2015/0081877 A1 | 3/2015 | Sethi et al. |
| 2015/0088964 A1 | 3/2015 | Shiell et al. |
| 2015/0088972 A1 | 3/2015 | Brand et al. |
| 2015/0089621 A1 | 3/2015 | Khalid |
| 2015/0095516 A1 | 4/2015 | Bergman |
| 2015/0106864 A1 | 4/2015 | Li et al. |
| 2015/0120671 A1* | 4/2015 | Kao .................... G06F 11/1451 707/654 |
| 2015/0154051 A1 | 6/2015 | Kruglick |
| 2015/0156279 A1 | 6/2015 | Vaswani et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0188734 A1 | 7/2015 | Petrov |
| 2015/0189042 A1 | 7/2015 | Sun et al. |
| 2015/0200991 A1 | 7/2015 | Kwon |
| 2015/0207733 A1 | 7/2015 | Richardson et al. |
| 2015/0215656 A1 | 7/2015 | Pulung et al. |
| 2015/0222536 A1* | 8/2015 | Bergman ............... H04L 43/16 709/224 |
| 2015/0229710 A1 | 8/2015 | Sivasubramanian et al. |
| 2015/0244580 A1 | 8/2015 | Saavedra |
| 2015/0256647 A1 | 9/2015 | Richardson et al. |
| 2015/0288647 A1 | 10/2015 | Chhabra et al. |
| 2015/0319194 A1 | 11/2015 | Richardson et al. |
| 2015/0319260 A1 | 11/2015 | Watson |
| 2015/0334082 A1 | 11/2015 | Richardson et al. |
| 2015/0341431 A1 | 11/2015 | Hartrick et al. |
| 2015/0358276 A1 | 12/2015 | Liu et al. |
| 2015/0358436 A1 | 12/2015 | Kim et al. |
| 2015/0363113 A1 | 12/2015 | Rahman et al. |
| 2015/0363282 A1 | 12/2015 | Rangasamy |
| 2016/0006672 A1 | 1/2016 | Saavedra |
| 2016/0021197 A1 | 1/2016 | Pogrebinsky et al. |
| 2016/0026568 A1 | 1/2016 | Marshall et al. |
| 2016/0028598 A1 | 1/2016 | Khakpour et al. |
| 2016/0028644 A1 | 1/2016 | Richardson et al. |
| 2016/0028755 A1 | 1/2016 | Vasseur et al. |
| 2016/0034397 A1* | 2/2016 | Lam .................... G06F 12/0842 711/119 |
| 2016/0036857 A1 | 2/2016 | Foxhoven et al. |
| 2016/0041910 A1 | 2/2016 | Richardson et al. |
| 2016/0065475 A1 | 3/2016 | Hilt et al. |
| 2016/0065665 A1 | 3/2016 | Richardson et al. |
| 2016/0072669 A1 | 3/2016 | Saavedra |
| 2016/0072720 A1 | 3/2016 | Richardson et al. |
| 2016/0088118 A1 | 3/2016 | Sivasubramanian et al. |
| 2016/0104346 A1 | 4/2016 | Ovalle et al. |
| 2016/0132600 A1 | 5/2016 | Woodhead et al. |
| 2016/0134492 A1 | 5/2016 | Ellsworth et al. |
| 2016/0142251 A1 | 5/2016 | Contreras et al. |
| 2016/0157209 A1* | 6/2016 | Baldwin ............ H04W 72/005 370/216 |
| 2016/0182454 A1 | 6/2016 | Phonsa et al. |
| 2016/0182542 A1 | 6/2016 | Staniford |
| 2016/0205062 A1 | 7/2016 | Mosert |
| 2016/0241637 A1 | 8/2016 | Marr et al. |
| 2016/0241639 A1 | 8/2016 | Brookins et al. |
| 2016/0253262 A1 | 9/2016 | Nadgowda |
| 2016/0255042 A1 | 9/2016 | Newton |
| 2016/0269927 A1 | 9/2016 | Kim et al. |
| 2016/0274929 A1 | 9/2016 | King |
| 2016/0294678 A1 | 10/2016 | Khakpour et al. |
| 2016/0308959 A1 | 10/2016 | Richardson et al. |
| 2016/0337202 A1* | 11/2016 | Ben-Itzhak ........... H04L 45/745 |
| 2016/0337426 A1 | 11/2016 | Shribman et al. |
| 2016/0366202 A1 | 12/2016 | Phillips et al. |
| 2017/0041428 A1 | 2/2017 | Katsev |
| 2017/0085495 A1 | 3/2017 | Richardson et al. |
| 2017/0099345 A1 | 4/2017 | Leach |
| 2017/0109316 A1 | 4/2017 | Hack et al. |
| 2017/0126557 A1 | 5/2017 | Richardson et al. |
| 2017/0126796 A1 | 5/2017 | Hollis et al. |
| 2017/0142062 A1 | 5/2017 | Richardson et al. |
| 2017/0153980 A1 | 6/2017 | Araújo et al. |
| 2017/0155678 A1 | 6/2017 | Araújo et al. |
| 2017/0155732 A1 | 6/2017 | Araújo et al. |
| 2017/0163425 A1 | 6/2017 | Kaliski, Jr. |
| 2017/0171146 A1 | 6/2017 | Sharma et al. |
| 2017/0180217 A1 | 6/2017 | Puchala et al. |
| 2017/0180267 A1 | 6/2017 | Puchala et al. |
| 2017/0214755 A1 | 7/2017 | Sivasubramanian et al. |
| 2017/0214761 A1 | 7/2017 | Hsu et al. |
| 2017/0250821 A1 | 8/2017 | Richardson et al. |
| 2017/0257340 A1 | 9/2017 | Richardson et al. |
| 2017/0344657 A1* | 11/2017 | Liang ..................... H04L 43/00 |
| 2017/0353395 A1 | 12/2017 | Richardson et al. |
| 2018/0063027 A1 | 3/2018 | Rafferty |
| 2018/0077109 A1 | 3/2018 | Hoeme et al. |
| 2018/0077110 A1 | 3/2018 | Huston, III et al. |
| 2018/0097631 A1 | 4/2018 | Uppal et al. |
| 2018/0097634 A1 | 4/2018 | Uppal et al. |
| 2018/0097831 A1 | 4/2018 | Uppal et al. |
| 2018/0109553 A1 | 4/2018 | Radlein et al. |
| 2018/0159757 A1 | 6/2018 | Uppal et al. |
| 2018/0159769 A1 | 6/2018 | Richardson et al. |
| 2018/0167444 A1 | 6/2018 | Sivasubramanian et al. |
| 2018/0167469 A1 | 6/2018 | Sivasubramanian et al. |
| 2018/0173526 A1 | 6/2018 | Prinsloo et al. |
| 2018/0183689 A1 | 6/2018 | Ellsworth et al. |
| 2018/0191817 A1 | 7/2018 | Richardson et al. |
| 2018/0212880 A1 | 7/2018 | Mostert |
| 2018/0213052 A1 | 7/2018 | Maccarthaigh et al. |
| 2018/0241796 A1* | 8/2018 | Srinivasan ............ H04L 65/80 |
| 2018/0278717 A1 | 9/2018 | Richardson et al. |
| 2018/0285207 A1* | 10/2018 | Mehta ................ G06F 11/1464 |
| 2018/0287916 A1 | 10/2018 | Mizik et al. |
| 2018/0302322 A1 | 10/2018 | Richardson et al. |
| 2018/0332107 A1 | 11/2018 | Marr et al. |
| 2018/0351904 A1 | 12/2018 | Mizik et al. |
| 2018/0367498 A1 | 12/2018 | Bliss et al. |
| 2019/0007515 A1 | 1/2019 | Baldwin et al. |
| 2019/0020562 A1 | 1/2019 | Richardson et al. |
| 2019/0028562 A1 | 1/2019 | Watson et al. |
| 2019/0044787 A1 | 2/2019 | Richardson et al. |
| 2019/0044846 A1 | 2/2019 | Howard et al. |
| 2019/0073303 A1 | 3/2019 | Marshall et al. |
| 2019/0089542 A1 | 3/2019 | Richardson et al. |
| 2019/0098109 A1 | 3/2019 | Watson |
| 2019/0121739 A1 | 4/2019 | Richardson et al. |
| 2019/0129908 A1 | 5/2019 | Kumarasamy |
| 2019/0140922 A1 | 5/2019 | Ellsworth et al. |
| 2019/0173941 A1 | 6/2019 | Puchala et al. |
| 2019/0173972 A1 | 6/2019 | MacCarthaigh et al. |

FOREIGN PATENT DOCUMENTS

| | | |
|---|---|---|
| CN | 1511399 A | 7/2004 |
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |

(56) References Cited

FOREIGN PATENT DOCUMENTS

| | | |
|---|---|---|
| EP | 1351141 A2 | 10/2007 |
| EP | 2008167 A2 | 12/2008 |
| EP | 3156911 A1 | 4/2017 |
| JP | 07-141305 | 6/1995 |
| JP | 2001-0506093 | 5/2001 |
| JP | 2001-249907 | 9/2001 |
| JP | 2002-024192 | 1/2002 |
| JP | 2002-044137 | 2/2002 |
| JP | 2002-323986 | 11/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-070935 | 3/2004 |
| JP | 2004-532471 | 10/2004 |
| JP | 2004-533738 A | 11/2004 |
| JP | 2005-537687 | 12/2005 |
| JP | 2007-133896 A | 5/2007 |
| JP | 2007-207225 A | 8/2007 |
| JP | 2008-515106 A | 5/2008 |
| JP | 2009-071538 A | 4/2009 |
| JP | 2012-509623 | 4/2012 |
| JP | 2012-209623 | 10/2012 |
| WO | WO 2002/069608 A2 | 9/2002 |
| WO | WO 2005/071560 A1 | 8/2005 |
| WO | WO 2007/007960 A1 | 1/2007 |
| WO | WO 2007/126837 A2 | 11/2007 |
| WO | WO 2009124006 A2 | 10/2009 |
| WO | WO 2010/002603 A1 | 1/2010 |
| WO | WO 2012/044587 | 4/2012 |
| WO | WO 2012065641 A1 | 5/2012 |
| WO | WO 2014/047073 A1 | 3/2014 |
| WO | WO 2017/106455 A1 | 6/2017 |

OTHER PUBLICATIONS

Arends et al., DNS Security Introduction and Requirements, RFC 4033, Mar. 2005, 21 pages.
Ariyapperuma et al., "Security Vulnerabilities in DNS and DNS-SEC." The Second International Conference on Availability, Reliability and Security, IEEE, 2007, 8 pages.
Chandramouli et al., "Challenges in Securing the Domain Name System." IEEE Security & Privacy4.1 (2006),pp. 84-87.
Eastlake, Donald, Domain Name System Security Extensions, RFC 2535, Mar. 1999, 47 pages.
Cohen et al., "Proactive Caching of DNS Records: Addressing a Performance Bottleneck", Proceedings of Saint 2001 Symposium On Applications and the Internet; 8-12, Jan. 8, 2001, IEEE Computer Society, pp. 85-94.
JH Software, Moving a DNS Server to a New IP Address, last updated Jan. 26, 2006, 1 page.
Office Action in European Application No. 11767118.0 dated Jul. 25, 2018.
Extended Search Report in European Application No. 18156163 dated Sep. 3, 2018.
Office Action in Chinese Application No. 2013800492635 dated Aug. 30, 2017.
Krsul et al., "VMPlants: Providing and Managing Virtual Machine Execution Environments for Grid Computing", Nov. 6, 2004 (Nov. 6, 2004), Supercomputing, 2004. Proceedings Of The ACM/IEEE SC2004 Conference Pittsburgh, PA, USA Nov. 6-12, 2004, Piscataway, NJ, USA, IEEE, 1730 Massachusetts Ave., NW Washington, DC 20036-1992 USA, 12 pages.
Zhao et al., "Distributed file system support for virtual machines in grid computing", Jun. 4, 2004 (Jun. 4, 2004), High Performance Distributed Computing, 2004. Proceedings. 13th IEEE International Symposium on Honolulu, HI, USA Jun. 4-6, 2004, Piscataway, NJ, USA, IEEE, pp. 202-211.
Office Action in Indian Application No. 5937/CHENP/2010 dated Jan. 19, 2018.
Office Action in Indian Application No. 6210/CHENP/2010 dated Mar. 27, 2018.
Office Action in Chinese Application No. 201310537815.9 dated Feb. 1, 2018.
Office Action in European Application No. 07754164.7 dated Jan. 25, 2018.
"Non-Final Office Action dated Jan. 3, 2012," U.S. Appl. No. 12/652,541, filed Jan. 3, 2012; 35 pages.
"Final Office Action dated Sep. 5, 2012," U.S. Appl. No. 12/652,541, filed Sep. 5, 2012; 40 pages.
"Notice of Allowance dated Jan. 4, 2013," U.S. Appl. No. 12/652,541, filed Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdeliverynetwork&oldid=6010099 70, XP055153445, Mar. 24, 2008.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONG-MAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSP ARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3.xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
Armour et al.: "A Heuristic Algorithm and Simulation Approach to Relative Location of Facilities"; Management Science, vol. 9, No. 2 (Jan. 1963); pp. 294-309.

(56) References Cited

OTHER PUBLICATIONS

Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Byun et al., "A Dynamic Grid Services Deployment Mechanism for On-Demand Resource Provisioning", IEEE International Symposium on Cluster Computing and the Grid:863-870, 2005.
Chipara et al, "Realtime Power-Aware Routing in Sensor Network", IEEE, 2006, 10 pages.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Deleuze, C., et al., A DNS Based Mapping Peering System for Peering CDNs, draft-deleuze-cdnp-dnsmap-peer-00.txt, Nov. 20, 2000, 20 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes",May 2005, In Proc. Of Networking 2005, all pages.
Gunther et al, "Measuring Round Trip Times to determine the Distance between WLAN Nodes", Dec. 18, 2004, Technical University Berlin, all pages.
Guo, F., Understanding Memory Resource Management in Vmware vSphere 5.0, Vmware, 2011, pp. 1-29.
Hameed, CC, "Disk Fragmentation and System Performance", Mar. 14, 2008, 3 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Horvath et al., "Enhancing Energy Efficiency in Multi-tier Web Server Clusters via Prioritization," in Parallel and Distributed Processing Symposium, 2007. IPDPS 2007. IEEE International , vol., No., pp. 1-6, Mar. 26-30, 2007.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.com/articles/printerfriendly.aspx?p=169508, 19 pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer-Difference in distribution technique and supported protocl-Focus on function to meet the needs, Nikkei Communications, Japan, Nikkei Business Publications, Inc., Mar. 20, 2000, vol. 314, pp. 114-123.
Kenshi, P., "Help File Library: Iptables Basics," Justlinux, retrieved Dec. 1, 2005, from http://www.justlinux.com/nhf/Security/Iptables _ Basics.html, 4 pages.
Liu, "The Ultimate Guide to Preventing DNS-based DDoS Attacks", Retrieved from http://www.infoworld.com/article/2612835/security/the-ultimate-guide-to-preventing-dns-based-ddos-attacks.html, Published Oct. 30, 2013.
Liu et al., "Combined mining of Web server logs and web contents for classifying user navigation patterns and predicting users' future requests," Data & Knowledge Engineering 61 (2007) pp. 304-330.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Ragan, "Three Types of DNS Attacks and How to Deal with Them", Retrieved from http://www.csoonline.com/article/2133916/malware-cybercrime/three-types-of-dns-attacks-and-how-to-deal-with-them.html, Published Aug. 28, 2013.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Sharif et al, "Secure In-VM Monitoring Using Hardware Virtualization", Microsoft, Oct. 2009 http://research.microsoft.com/pubs/153179/sim-ccs09.pdf; 11 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Takizawa, et al., "Scalable MultiReplication Framework on The Grid," Report of Study of Information Processing Society of Japan, Information Processing Society, vol. 2004, No. 81, pp. 247-252, Japan, Aug. 1, 2004.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Van Renesse, R., "Astrolabe: A Robust and Scalable Technology For Distributed System Monitoring, Management, And Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814,76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Xu et al., "Decision tree regression for soft classification of remote sensing data", Remote Sensing of Environment 97 (2005) pp. 322-336.
Yamagata, et al., "A virtual-machine based fast deployment tool for Grid execution environment," Report of Study of Information

(56) References Cited

OTHER PUBLICATIONS

Processing Society of Japan, Information Processing Society, vol. 2006, No. 20, pp. 127-132, Japan, Feb. 28, 2006.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Supplementary European Search Report in Application No. 09729072.0 2266064 dated Dec. 10, 2014.
First Singapore Written Opinion in Application No. 201006836-9, dated Oct. 12, 2011 in 12 pages.
Singapore Written Opinion in Application No. 201006836-9, dated Apr. 30, 2012 in 10 pages.
First Office Action in Chinese Application No. 200980111422.3 dated Apr. 13, 2012.
First Office Action in Japanese Application No. 2011-502138 dated Feb. 1, 2013.
Singapore Written Opinion in Application No. 201006837-7, dated Oct. 12, 2011 in 11 pages.
Supplementary European Search Report in Application No. 09727694.3 dated Jan. 30, 2012 in 6 pages.
Singapore Examination Report in Application No. 201006837-7 dated Mar. 16, 2012.
First Office Action in Chinese Application No. 200980111426.1 dated Feb. 16, 2013.
Second Office Action in Chinese Application No. 200980111426.1 dated Dec. 25, 2013.
Third Office Action in Chinese Application No. 200980111426.1 dated Jul. 7, 2014.
Fourth Office Action in Chinese Application No. 200980111426.1 dated Jan. 15, 2015.
Fifth Office Action in Chinese Application No. 200980111426.1 dated Aug. 14, 2015.
First Office Action in Japanese Application No. 2011-502139 dated Nov. 5, 2013.
Decision of Rejection in Application No. 2011-502139 dated Jun. 30, 2014.
Office Action in Japanese Application No. 2011-502139 dated Aug. 17, 2015.
Singapore Written Opinion in Application No. 201006874-0, dated Oct. 12, 2011 in 10 pages.
First Office Action in Japanese Application No. 2011-502140 dated Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Search Report in European Application No. 09839809.2 dated May 11, 2015.
Office Action in European Application No. 09839809.2 dated Dec. 8, 2016.
Supplementary European Search Report in Application No. 09728756.9 dated Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Office Action in Japanese Application No. 2014-225580 dated Oct. 26, 2015.
Office Action in Japanese Application No. 2014-225580 dated Oct. 3, 2016.
Search Report and Written Opinion issued in Singapore Application No. 201006873-2 dated Oct. 12, 2011.
First Office Action is Chinese Application No. 200980125551.8 dated Jul. 4, 2012.
First Office Action in Japanese Application No. 2011-516466 dated Mar. 6, 2013.
Second Office Action in Japanese Application No. 2011-516466 dated Mar. 17, 2014.
Decision of Refusal in Japanese Application No. 2011-516466 dated Jan. 16, 2015.
Office Action in Japanese Application No. 2011-516466 dated May 30, 2016.
Office Action in Canadian Application No. 2726915 dated May 13, 2013.
First Office Action in Korean Application No. 10-2011-7002461 dated May 29, 2013.
First Office Action in Chinese Application No. 200980145872.4 dated Nov. 29, 2012.
First Office Action in Canadian Application No. 2741895 dated Feb. 25, 2013.
Second Office Action in Canadian Application No. 2741895 dated Oct. 21, 2013.
Partial Supplementary Search Report in European Application No. 09826977.2 dated Oct. 4, 2016.
Search Report and Written Opinion in Singapore Application No. 201103333-9 dated Nov. 19, 2012.
Examination Report in Singapore Application No. 201103333-9 dated Aug. 13, 2013.
Office Action in Chinese Application No. 201310717573.1 dated Jul. 29, 2016.
Office Action in European Application No. 11767118.0 dated Feb. 3, 2017.
International Search Report and Written Opinion in PCT/US2011/053302 dated Nov. 28, 2011 in 11 pages.
International Preliminary Report on Patentability in PCT/US2011/053302 dated Apr. 2, 2013.
First Office Action in Japanese Application No. 2013-529454 dated Feb. 3, 2014 in 6 pages.
Office Action in Japanese Application No. 2013-529454 dated Mar. 9, 2015 in 8 pages.
First Office Action issued in Australian Application No. 2011307319 dated Mar. 6, 2014 in 5 pages.
Search Report and Written Opinion in Singapore Application No. 201301573-0 dated Jul. 1, 2014.
First Office Action in Chinese Application No. 201180046104.0 dated Nov. 3, 2014.
Second Office Action in Chinese Application No. 201180046104.0 dated Sep. 29, 2015.
Third Office Action in Chinese Application No. 201180046104.0 dated Apr. 14, 2016.
Decision of Rejection in Chinese Application No. 201180046104.0 dated Oct. 17, 2016.
Examination Report in Singapore Application No. 201301573-0 dated Dec. 22, 2014.
International Preliminary Report on Patentability in PCT/US2011/061486 dated May 22, 2013.
International Search Report and Written Opinion in PCT/US2011/061486 dated Mar. 30, 2012 in 11 pages.
Office Action in Canadian Application No. 2816612 dated Nov. 3, 2015.
Office Action in Canadian Application No. 2816612 dated Oct. 7, 2016.
First Office Action in Chinese Application No. 201180053405.6 dated Feb. 10, 2015.
Second Office Action in Chinese Application No. 201180053405.6 dated Dec. 4, 2015.
Office Action in Japanese Application No. 2013-540982 dated Jun. 2, 2014.
Written Opinion in Singapore Application No. 201303521-7 dated May 20, 2014.
Office Action in Japanese Application No. 2015-533132 dated Apr. 25, 2016.
Office Action in Canadian Application No. 2884796 dated Apr. 28, 2016.

(56) References Cited

OTHER PUBLICATIONS

Office Action in Russian Application No. 2015114568 dated May 16, 2016.
International Search Report and Written Opinion in PCT/US07/07601 dated Jul. 18, 2008 in 11 pages.
International Preliminary Report on Patentability in PCT/US2007/007601 dated Sep. 30, 2008 in 8 pages.
Supplementary European Search Report in Application No. 07754164.7 dated Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 dated Dec. 11, 2012 in 26 pages.
Office Action in Japanese Application No. 2013-123086 dated Apr. 15, 2014 in 3 pages.
Office Action in Japanese Application No. 2013-123086 dated Dec. 2, 2014 in 4 pages.
Office Action in Japanese Application No. 2015-075644 dated Apr. 5, 2016.
Office Action in European Application No. 07754164.7 dated Dec. 14, 2015.
Office Action in Chinese Application No. 201310537815.9 dated Jul. 5, 2016.
International Search Report and Written Opinion in PCT/US/2016/066848 dated May 1, 2017.
Office Action in Application No. 09729072.0 dated May 14, 2018.
Examination Report in Indian Application No. 6213/CHENP/2010 dated May 23, 2018.
International Preliminary Report on Patentability in PCT/US/2016/066848 dated Jun. 19, 2018.
Supplementary Examination Report in Singapore Application No. 11201501987U dated May 17, 2017.
Office Action in Chinese Application No. 201310537815.9 dated Jun. 2, 2017.
Office Action in Canadian Application No. 2816612 dated Aug. 8, 2017.
Office Action in Application No. 09729072.0 dated Dec. 7, 2018.
Office Action in European Application No. 11767118.0 dated Jan. 29, 2019.
Examination Report in Indian Application No. 3105/DELNP/2013, dated Feb. 19, 2019.
Examination Report in Indian Application No. 4487/DELNP/2013 dated Dec. 28, 2018.
Frangoudis et al., "PTPv2-based network load estimation and its application to QoE monitoring for Over-the-Top services", IEEE, The 5th International conference on Information, Intelligence, Systems and Applications, IISA 2014, XP032629858, Jul. 7, 2014, pp. 176-181.
Office Action in European Application No. 13770602.4 dated Mar. 11, 2019.
International Preliminary Report on Patentability and Written Opinion in PCT/US2017/055156 dated Apr. 9, 2019.
International Search Report and Written Opinion in PCT/US2018/036634 dated Sep. 11, 2018.

\* cited by examiner

EFFICIENT SERVING OF RESOURCES DURING SERVER UNAVAILABILITY

BACKGROUND

In a computer network context, servers may be used provide network content. In some cases, the servers dynamically generate the network content. Under heavy system loads or any other unavailability or latency issues, the servers may be unable to provide the content. Accordingly, the requesting devices may receive error messages that the network content is unavailable. While the servers are experiencing issues, additional requests may continue to be received by the servers that can further delay recovery from the failure situations.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
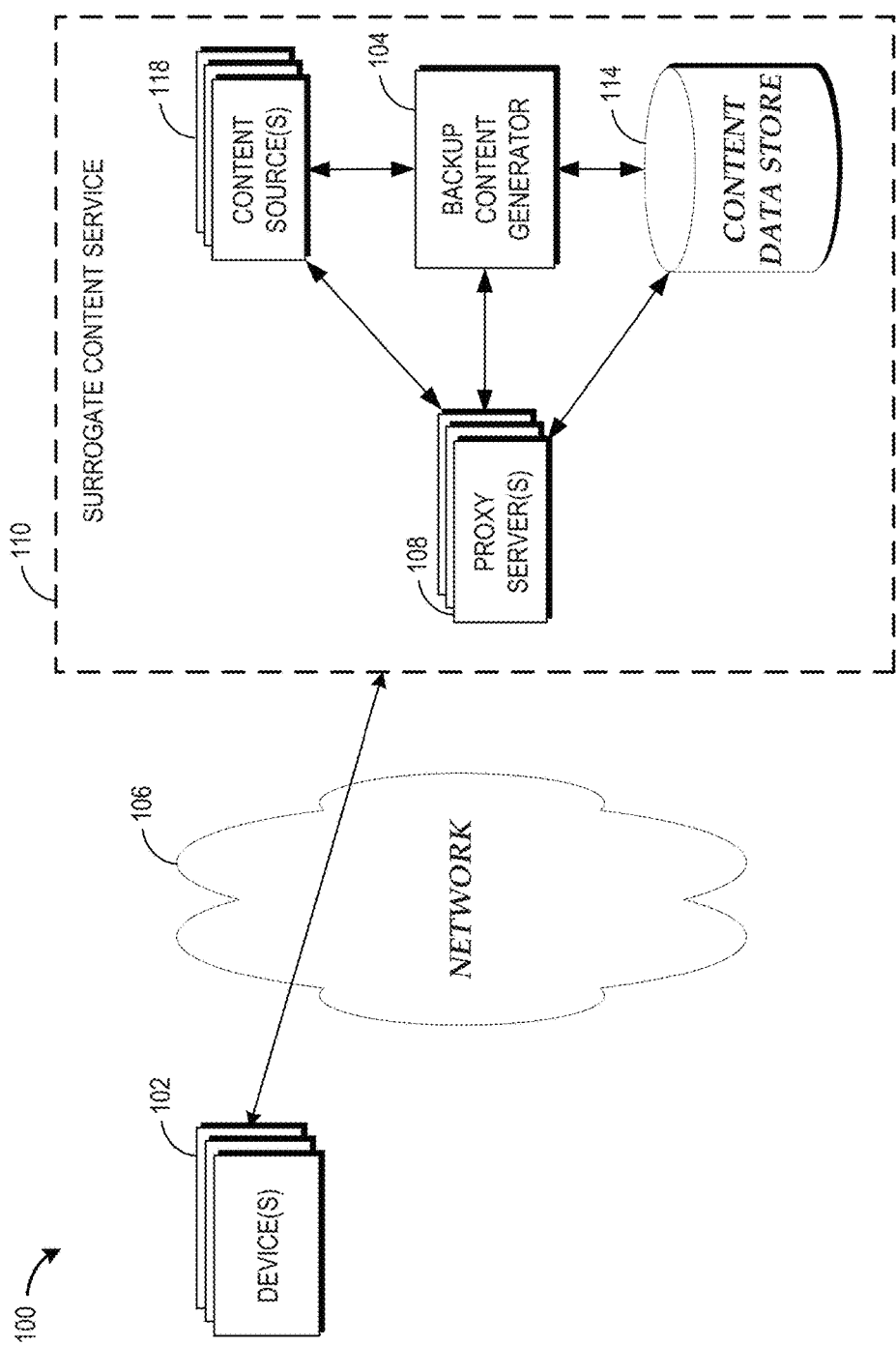
FIG. 1 is a schematic block diagram depicting an illustrative network environment for implementing a surrogate content service to efficiently providing content during server unavailability.

Generally described, aspects of the present disclosure are directed to a system and method for efficiently providing content during server unavailability and/or computer network latency. For example, a network service may include one or more servers for receiving resource requests, such as proxy servers. The network service may further communicate and/or include content sources that provide and/or generate network resources. The content sources may dynamically generate the network resources, such as a complex network page, using multi-dependent services. Under heavy system loads or any other unavailability or latency issues, the content sources may be unable to provide the resources at all or in a timely manner. A surrogate system may generate pre-computed, backup and/or static versions of the resource. Thus, when a content server and/or a network resource is unavailable, instead of receiving an error message, the example surrogate system returns the pre-computed backup resource. A backup content generator may identify a frequently accessed and/or requested network resource and may generate a backup version of the dynamic or non-dynamic resource. The backup version of the resource may be stored in a data store with a staleness indicator. When a network resource is unavailable, then an example proxy server redirects the request to cause retrieval of the backup version of the resource, which may be further based on rules configured by a rules engine. The example rules can indicate when the traffic should be switched and/or at what rate the traffic should be shifted from content sources to backup sources and/or vice versa.

The term "resource," as used herein, and in addition to having its ordinary meaning, refers to any data that may be stored in a data store in any data format. Similarly, the term "backup resource," as used herein, and in addition to having its ordinary meaning, refers to data that is related to a resource that may be stored in a data store in any data format. An example resource may be identified by a resource identifier, such as a Uniform Resource Identifier (URI) or a Uniform Resource Locator (URL). An example resource may be the modular and/or may include one or more resource identifiers. For example, a resource corresponding to a network page may include one or more <iframe> tags that correspond to one or more additional resource identifiers. Some example resources may be "dynamic" in that a content source may generate a resource and/or the content of the resource may change over time. Accordingly, some example backup resources may be "static" in that a copy of the generated resource is stored. Thus, if there is an unavailability issue with the content source, then the backup resource can be retrieved without a dynamic version of the resource needing to be generated. However, an example backup resource can still include dynamic content, but it may be a static resource in the sense that it is available from a data store in the event that the content source is determined to be unavailable. An example resource identifier is "http://example.org/page/" that refers to a resource "/page" that may be a Hypertext Markup Language (HTML) page that can be obtained via the Hypertext Transfer Protocol (HTTP) from a network host of a content delivery network service. Other example resource and resource identifiers include "http://example.org/page/icon.png", "http://example.org/examplejs", and "http://example.org/example.css". Thus, example resources include files, images, videos, audio, code, etc. Additional example resources include data that may be sent from a server to a client application, such as mobile application that is not a network browser in some embodiments.

The term "unavailability," as used herein, in addition to having its ordinary meaning, refers to any instance when a computing device functions irregularly. Example irregularities include not responding to any requests, responding only to a portion of requests, or responding to requests in a delayed manner. While unavailability of a server is sometimes described herein with reference to a server being unresponsive, unavailability of a server may also include response slowness such as increased latency. Accordingly, an "unavailability level," as used herein, and in addition to having its ordinary meaning, refers to a measurement of irregularity in a computing device, such as a quantification of unresponsiveness and/or latency.

The systems and methods described herein improve computer and/or computer network technology. The systems and methods described herein may be intrinsically tied to network and/or computer technology because such solutions may be related to communication over computer networks. As described herein, providing backup resources while a server is unavailable increases content availability. Further, using a surrogate content service can enable efficient recovery from system failures, such as server unavailability and/or network latency issues. For example, when a server becomes unavailable in existing network systems, the systems become overloaded with requests and may have difficulty in recovering. However, the example surrogate content service receives resource requests during server unavailability that facilitate recovery of the content sources experiencing issues. Similarly, network latency and/or traffic can be reduced with the surrogate content service since the service can efficiently handle requests during system failures. Existing cache systems are not designed to handle system failures, unlike the systems and methods described herein, such as the rules and application logic that are described in further detail herein. Thus, advantages of the example surrogate content service include improved content availability, improved system recovery, and/or reduced network latency and/or traffic.

Turning to FIG. 1, an illustrative network environment 100 is shown in which a surrogate content service may provide backup resources. The network environment 100 may include one or more computing devices 102 and a surrogate content service 110. The surrogate content service 110 includes one or more proxy servers 108, one or more content sources 118, a backup content generator 104, and a content data store 114. The constituents of the network environment 100 may be in communication with each other either locally or over a network 106.

The computing device 102 may be any computing device capable of communicating over the network 106 and requesting content, such as a laptop or tablet computer, personal computer, personal digital assistant (PDA), hybrid PDA/mobile phone, mobile phone, smartphone, wearable computing device, electronic book reader, set-top or other television box, camera, audiobook player, digital media player, video game console, in-store kiosk, television, appliance, electronic device for inclusion in vehicles or machinery, gaming device, or the like. The computing device 102 may generally be capable of accessing network resources, such as content pages, via the network 106. For example, the computing device 102 may include a browser that accesses content sites and/or requests network resources. Additionally or alternatively, the computing device 102 may include an application, such as an electronic storefront, that accesses and/or requests resources from the surrogate content service 110.

In some embodiments, the proxy server 108 may implement some aspects of the surrogate content service 110. For example, the proxy server 108 may receive a resource request. A redirect handler application of the proxy server 108 may apply one or more rules to determine whether the requested resource and/or content source is unavailable. If the requested resource and/or content source is unavailable, the redirect handler may determine that a backup version of the resource should be provided.

The content sources 118 provide resources. The example resources include static and dynamic content. Continuing with the example, the content sources 118 include multi-dependent services that can dynamically generate complex resources, such as large network pages. Example content sources 118 include network servers that respond to resource requests. As described herein, due to heavy system loads or any other unavailability or latency issues, the content sources 118 may be unavailable and/or effectively unavailable. In some embodiments, the content sources 118 include one or more services. The services may be dependent on one another, such as in a service-oriented architecture and/or a service dependency graph, as described herein.

The backup content generator 104 generates the backup resources from the content sources 118. The example backup content generator 104 generates backup content at predetermined intervals from the content sources 118. For example, the backup content generator 104 requests static and/or dynamic content from the content sources 118 and stores backup versions of the content in the content data store 114. In some embodiments, the backup content generator 104 identifies frequently accessed resources and generates backup resources for those identified resources.

The computing device 102 may further be capable of presenting audio and visual content, images, video content, text, user interfaces, and/or user interface controls on a display screen. The computing device 102 may further be capable of receiving user input through a user input device, such as a keyboard, mouse, touchpad, microphone, trackball, touchscreen, image recognition through an input camera (e.g., eye, hand, head, body tracking and/or placement), gamepad, accelerometer, gyroscope, or other input device known in the art.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as HTTP. Protocols and components for communicating via the Internet or any of the other aforementioned types of communication networks are well known to those skilled in the art of computer communications and thus, need not be described in more detail herein.

The content data store 114 may electronically store, in some embodiments, backup resources, as further discussed herein. The example content data store 114 may be a part of a content delivery network. The content data store 114 may be embodied in hard disk drives, solid state memories, any other type of non-transitory computer-readable storage medium, and/or a file, a database, an object orientated database, document store, a relational database, in-memory cache, and/or stored in any such non-transitory computer-readable media accessible to the surrogate content service 110. The content data store 114 may also be distributed or partitioned across multiple local and/or remote storage devices without departing from the spirit and scope of the present disclosure.

The computing device 102 and/or the surrogate content service 110 may each be embodied in a plurality of devices. For example, the computing device 102 and/or surrogate content service 110 may include a network interface, memory, hardware processor, and non-transitory computer-readable medium drive, all of which may communicate with each other by way of a communication bus. The network interface may provide connectivity over the network 106 and/or other networks or computer systems. The hardware processor may communicate to and from memory containing program instructions that the hardware processor executes in order to operate the computing device 102 and/or surrogate content service 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the surrogate content service 110 may be represented in a single physical server or, alternatively, may be split into multiple physical servers. Additionally, the environment 100 may not include a network 106.

Additionally, in some embodiments, the surrogate content service 110 is implemented by one or more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

Figure 2:
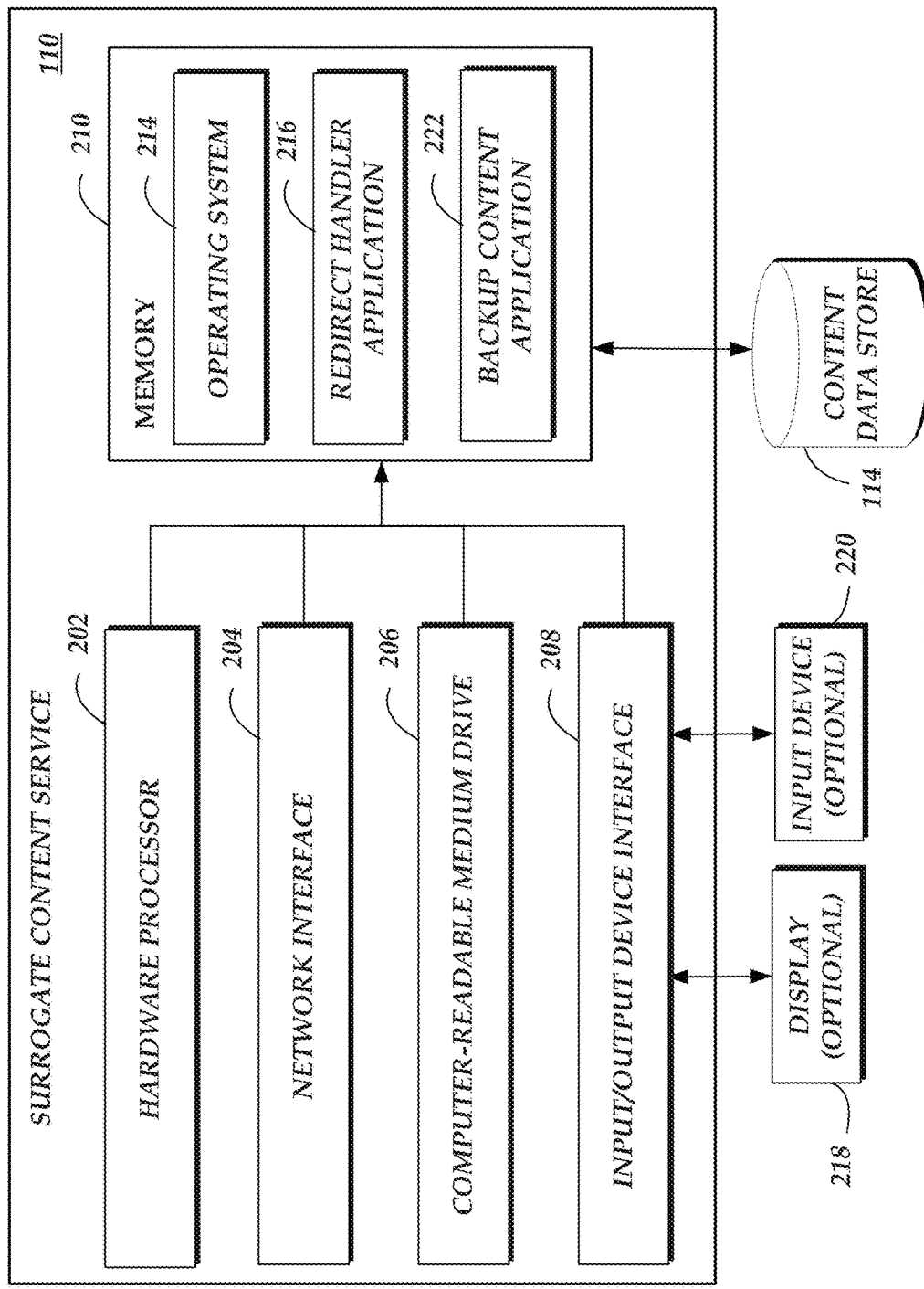
FIG. 2 is a schematic block diagram depicting an illustrative surrogate content service of the network environment depicted in FIG. 1.

FIG. 2 is a schematic diagram of the illustrative surrogate content service 110 shown in FIG. 1. The surrogate content service 110 includes an arrangement of computer hardware and software components that may be used to implement the surrogate content service. FIG. 2 depicts a general architecture of the surrogate content service 110 illustrated in FIG. 1. Those skilled in the art will appreciate that surrogate content service 110 may include more (or fewer) components than those shown in FIG. 2. Further, other computing systems described herein may include similar implementation arrangements of computer hardware and software components.

The surrogate content service 110 may include a hardware processor 202, a network interface 204, a non-transitory computer-readable medium drive 206, and an input/output device interface 208, all of which may communicate with one another by way of a communication bus. As illustrated, the surrogate content service 110 is associated with, or in communication with, an optional display 218 and an optional input device 220. In other embodiments, the display 218 and input device 220 may be included in the computing device 102 shown in FIG. 1. The network interface 204 may provide the surrogate content service 110 with connectivity to one or more networks or computing systems. The hardware processor 202 may thus receive information and instructions from other computing systems (such as the user computing device 102) or services via network 106. The hardware processor 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the hardware processor 202 executes in order to implement one or more embodiments of the surrogate content service. The memory 210 generally includes RAM, ROM and/or other persistent or non-transitory computer-readable storage media. The memory 210 may store an operating system 214 that provides computer program instructions for use by the hardware processor 202 in the general administration and operation of the surrogate content service 110. The memory 210 may further include other information for implementing aspects of the surrogate content service 110. For example, the memory 210 may communicate with the content data store 114. In some embodiments, the non-transitory computer-readable medium drive 206 may include the content data store 114.

The memory 210 may include a redirect handler application 216 that may be executed by the hardware processor 202. In some embodiments, the redirect handler application 216 may implement various aspects of the present disclosure. For example, the redirect handler application 216 may determine whether a resource and/or content source is unavailable. The redirect handler application 216 may apply one or more rules to make that determination. If the resource is unavailable, the redirect handler may determine to provide a backup version of the resource. Otherwise, the redirect handler application 216 causes the resource to be provided in its normal course.

The memory 210 may include a backup content application 222 that may be executed by the hardware processor 202. In some embodiments, the backup content application 222 may implement various aspects of the present disclosure. For example, the backup content application 222 generates the backup resources from one or more content sources, as described herein.

While the redirect handler application 216 and the backup content application 222 are illustrated as implemented by the surrogate content service 110, in other embodiments, the surrogate content service 110, and hence the redirect handler application 216 and the backup content application 222, may be implemented partially or entirely by another system, such as the proxy server 108 and/or the backup content generator 104. For example, the surrogate content service 110 may be provided as specifically configured application software implemented by hardware on the proxy server 108. Accordingly, the proxy server 108 may include the redirect handler application 216 and other components that operate similarly to the components illustrated as part of the surrogate content service 110, including a hardware processor 202, network interface 204, non-transitory computer-readable medium drive 206, input/output interface 208, memory 210, and so forth. Further, in some embodiments, the backup content application 222 may be implemented by the backup content generator 104.

Figure 3:
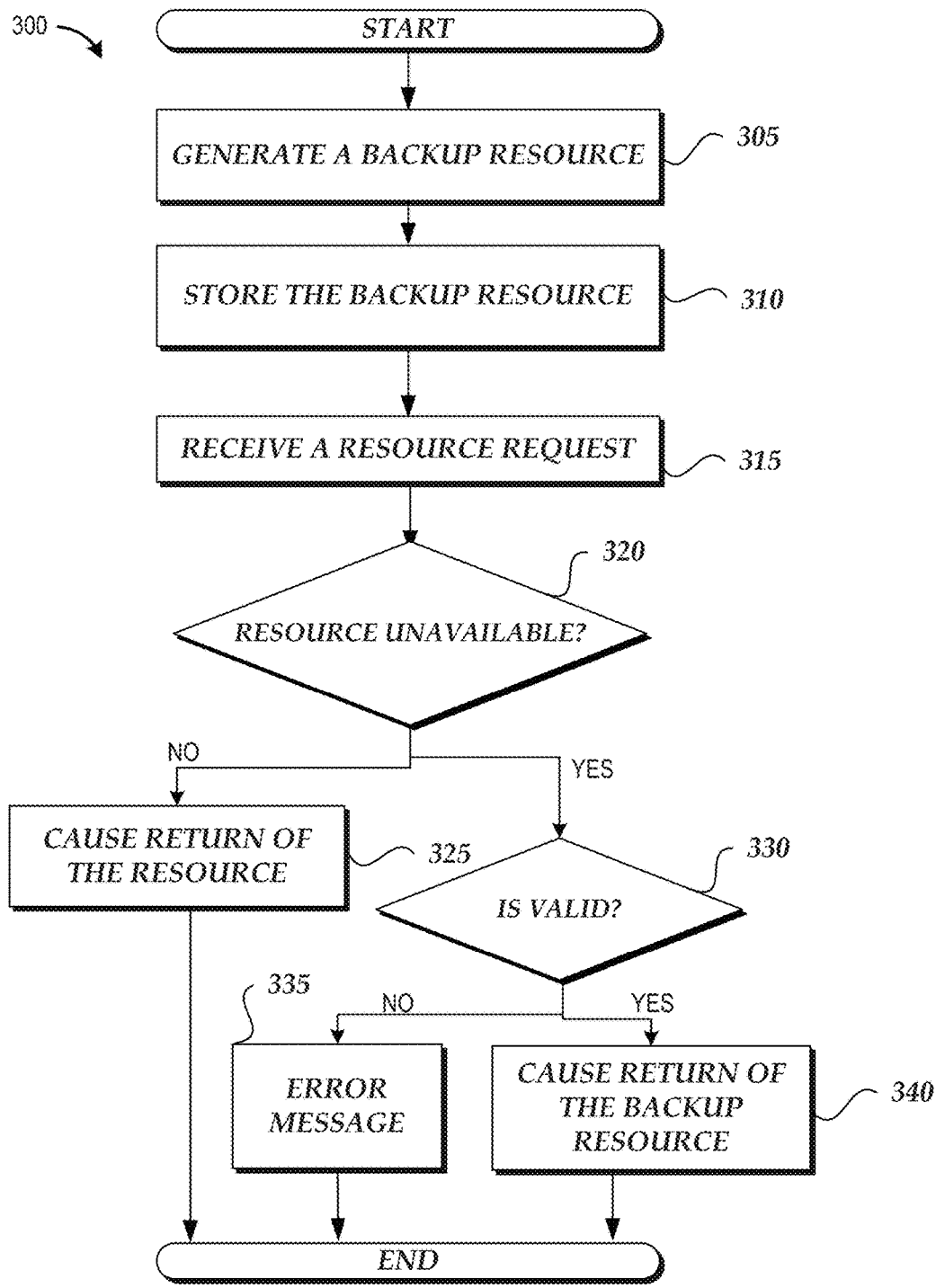
FIG. 3 is a flow diagram depicting an example method for managing resource requests.

FIG. 3 is a flow diagram depicting an example method 300 implemented by the surrogate content service 110 for managing resource requests. As discussed above, in some embodiments, the proxy server 108 implements aspects of the surrogate content service 110, such as the redirect handler application 216. Likewise, in some embodiments, the backup content generator 104 implements aspects of the surrogate content service 110, such as the backup content application 222. Thus, in some embodiments, the example proxy server 108 and/or the example backup content generator 104 implement aspects of the example method 300. Depending on the embodiment, the method of FIG. 3 may include fewer or additional blocks and/or the blocks may be performed in an order that is different than illustrated.

The example method 300 begins at block 305, where the surrogate content service 110 generates a backup resource. As described herein, the surrogate content service 110 generates a backup resource from a particular resource of the content sources 118. In some embodiments, the surrogate content service 110 generates the backup resource differently based on the type of the resource. Example types of resources include static and dynamic resources. The example surrogate content service 110 generates a backup resource for a static resource by copying it. As described herein, dynamic resources from the content sources 118 may change over time. In some embodiments, the surrogate content service 110 may copy a final version of a dynamically generated resource as the backup resource. Additionally or alternatively, the surrogate content service 110 may include application logic to invoke the content generation methods and/or services of the content sources 118 to generate the backup resource. In some embodiments, the surrogate content service 110 identifies resources that include user-customized content and removes the user-customized content so that the backup version of the resource can be provided to multiple users. Continuing with the example, the surrogate content service 110 determines that user-customized content is present based on tags in the resource. Additionally or alternatively, the surrogate content service 110 may dynamically determine that user-customized content is present by scanning the resource for user-customized content. In some embodiments, the surrogate content service 110 has a dedicated bandwidth to the content sources 118 and/or to the content generation methods of the content sources 118.

In some embodiments, the surrogate content service 110 generates backup resources continuously in the background. For example, the surrogate content service 110, such as the backup content application 222, runs in the background generating backup resources in predetermined intervals. Example intervals include every few minutes or every 10 seconds. The example intervals may be configurable and/or may be configurable for different resources or different resource types. In other embodiments, the surrogate content service 110 dynamically determines when to generate backup resources. As described herein, the surrogate content service 110 determines frequently accessed and/or requested resources and generates backup resources of those resources. The example surrogate content service 110 may generate backup resources for a predetermined threshold number of frequently accessed and/or requested resources.

At block 310, the surrogate content service 110 stores the backup resource in the content data store 114. As described herein, the surrogate content service 110 may store the backup resource with a staleness indicator. Example staleness indicators include a time to live and/or a timestamp corresponding to when the backup resource was created and/or stored. An example time to live includes a time to live value and/or a time to live parameter. The example time to live value is a period of time that the surrogate content service 110 will provide the backup resource while the content source 118 is unavailable. In some embodiments, the time to live value is a predetermined period of time, which may be configurable for particular resources or types of resources. In other embodiments, the time to live value is dynamically determined by the surrogate content service 110. Example periods for the time to live value include minutes, such as 10 minutes, hours, such as 1 hour, days, such as 1 day, etc. In some embodiments, the storage of the backup resource by the surrogate content service 110 may replace a previous version of the backup resource since the surrogate content service 110 may run in an iterative manner.

Additional example staleness indicators include booleans, flags, and/or versions. For example, the backup resource may be stored with a true or false boolean indicating the staleness and/or validity of the backup resource. Additionally or alternatively, the backup resource and/or multiple backup resources are stored with a version number. In some embodiments, the surrogate content service 110 uses the version number along with a probabilistic data structure to determine staleness. Additional details regarding determining staleness using version numbers and probabilistic data structures are described in further detail in U.S. patent application Ser. No. 15/280,859, titled "MEMORY-EFFICIENT MANAGEMENT OF COMPUTER NETWORK RESOURCES," filed on Sep. 29, 2016, which is hereby incorporated by reference in its entirety.

In some embodiments, the content data store 114 is a content delivery network, which may include many servers and/or data stores, such as thousands, across a large geographic area, such as the entire world. Accordingly, the content data store 114 may include regional servers and/or data stores that propagate data between each other. The surrogate content service 110 may store the backup resource in a regional content data store, which may then be propagated to other content data stores. The surrogate content service 110 may determine that particular backup resources should not be propagated, such as those resources that are customized for a particular geographic region, as described herein.

At block 315, the surrogate content service 110 and/or the proxy server 108 receives a resource request. For example, in the network computing context, the user computer device 102 requests one or more resources through a browser, such as by accessing a URL through a browser. Accordingly, the computing device 102 may request one or more resources, which may be directed towards the proxy server 108. The example resource request includes a resource identifier. In other embodiments, the user computer device 102 requests one or more resources through an application, such as a mobile application. For example, a user may start an application on the user computing device 102 and/or may interact with the application to cause the user computing device 102 to request a resource from the proxy server 108.

At block 320, the surrogate content service 110 and/or the proxy server 108 determines whether the requested resource and/or the corresponding content source 118 is unavailable. In some embodiments, the surrogate content service 110 determines unavailability by making a request to the content source 118 and if the response is delayed and/or is never received, then the surrogate content service 110 has determined an indication of unavailability. Additionally or alternatively, the surrogate content service 110 may implement a process, such as a health monitor, to continuously check whether a content source is back online and/or is responding to requests within a certain latency threshold and/or volume threshold. Further, if a backup resource becomes stale or will become stale soon, such as once a time to live expires or is to expire soon, the surrogate content service 110 may dynamically check the content sources 118 and/or the health monitor to see if the one or more contents sources 118 are available. The determination of unavailability may be further based on the application of one or more rules, which is described in further detail herein.

In some embodiments, the surrogate content service 110 dynamically determines whether a particular requested resource and/or the corresponding content source 118 is available or unavailable. For example, the proxy server 108 receives a first request is for a first resource. Continuing with the example, the surrogate content service 110 dynamically determines the unavailability of the first resource and/or a first content source, which may associated with the first resource and/or the first request. In the example, the proxy server 108 receives a second request is for a second resource different from the first resource. Accordingly, the example surrogate content service 110 dynamically determines the unavailability of the second resource. Additionally or alternatively, the example surrogate content service 110 dynamically determines a second content source associated with the second request, as described herein. The example surrogate content service 110 then determines that the second content source is available. Thus, in the example, the example surrogate content service 110 can dynamically service a first request initially directed towards a first content source that is unavailable and a second request may be directed towards a second content source that is available.

At block 325, if the resource and/or the content source 118 is available, then the surrogate content service 110 and/or the proxy server 108 provides a resource to the user computing device 102. However, if the resource and/or the content source 118 is unavailable, then the surrogate content service 110 proceeds to block 330.

At block 330, the surrogate content service 110 and/or the proxy server 108 determines whether a backup resource is available and/or the backup resource is valid. An example of the surrogate content service 110 determining if a backup resource is valid and/or not stale includes determining if there is a valid time to live value for the backup resource. Continuing with the example, the surrogate content service 110 generates a backup resource for a popular network page with a time to live value of 1 hour. Accordingly, if the surrogate content service 110 receives a request after the time to live, such as 2 hours after the backup resource was generated, then the surrogate content service 110 proceeds to block 335 and returns an error message, such as a "We're Sorry" page since the backup resource is no longer valid. Thus, the surrogate content service 110 may perform an example method of: determining a current time; determining a timestamp associated with the backup resource, such as a creation or storage time; determining a difference in time between the timestamp and the current time; and determining whether than the difference in time is within the time to live value. In some embodiments, the surrogate content service 110 evicts the backup resource from the content data store 114 if the backup resource is stale, such as if the time to live has expired. For example, the surrogate content service 110 determines that a backup resource is valid from a staleness indicator, such as a time to live value, a boolean, and/or a version number. Accordingly, if the backup resource is still valid, then the surrogate content service 110, at block 340, provides the backup resource and/or causes the backup resource to be returned to the user computing device 102.

In some embodiments, the surrogate content service 110 determines staleness and/or validity from one or more booleans, flags, and/or versions as described herein. For example, the surrogate content service 110 checks a true or false boolean indicating the validity of the backup resource. Additionally or alternatively, the surrogate content service 110 can use a requested version along with a probabilistic data structure to determine whether the backup resource is likely stale, which is described in further detail in U.S. patent application Ser. No. 15/280,859, titled "MEMORY-EFFICIENT MANAGEMENT OF COMPUTER NETWORK RESOURCES," filed on Sep. 29, 2016.

Figure 4:
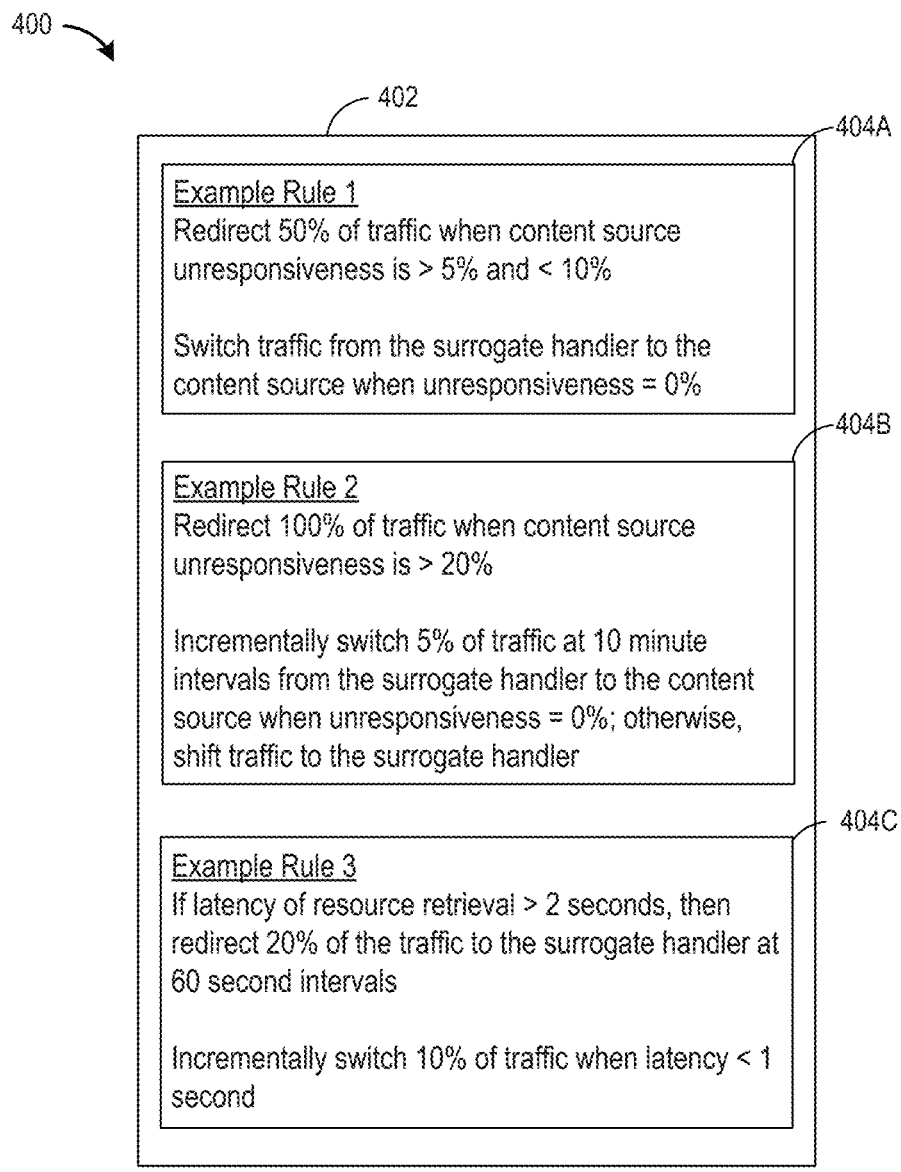
FIG. 4 is a pictorial diagram depicting example application logic for processing resource requests.

FIG. 4 illustrates an example data environment 400 that includes the example application logic 402. As described herein, the surrogate content service 110 may apply application logic, such as rules, for determining how resource requests should be processed. For example, the proxy server 108 may receive resource requests, and the proxy server 108 may apply the example application logic 402 to determine whether the response to the resource request should be handled by the content sources 118 or, in the case of a failure, by a surrogate handler to return a backup resource. In some embodiments, the surrogate handler may be an interface to the content data store 114 that stores the backup resources. Further, the example application logic 402 may modulate the traffic and/or the rate of the traffic between resources from the content sources 118 and backup resources, which may advantageously enable faster recovery and/or reduce bandwidth, latency, etc. While the example application logic 402 includes example thresholds of unavailability and/or latency measurements for some embodiments, other embodiments may use different thresholds. Further, the surrogate content service 110 may automatically modify the thresholds, modify the variables, modify the intervals, and/or generate rules based on different system factors as described herein.

The example application logic 402 includes the example rules 404A-404C. The example rules 404A-404C may be applied by a component of the surrogate content service 110, such as the proxy server 108. In the example, application of the one or more of rules 404A-404C determines how a resource request should be handled. Continuing with the example, if a backup resource should be returned, then the request may be forwarded to a surrogate handler running on the proxy server 108; otherwise, the request may be forwarded to the content sources 118. In other embodiments, the surrogate handler may run separate from the proxy server 108. Further, in some embodiments, application of the one or more of rules 404A-404C determines at what rate the traffic should be shifted from content sources 118 to the surrogate handler and/or vice versa. In some embodiments, the proxy server 108 may apply the rules 404A-404C sequentially and may stop processing additional rules if a rule is satisfied. In other embodiments, the proxy server 108 may only have a single rule to apply. In yet further embodiments, the proxy server 108 may apply multiple rules at a time.

The example rule 404A causes that the proxy server 108 to redirect a particular percentage of traffic, such as 50%, when the unresponsiveness of one or more of the content sources 118 is between a particular threshold and/or satisfies a particular condition, such as when the unresponsiveness is greater than 5% and less than 10%. Further, the example rule 404A causes the proxy server 108 to switch traffic from the surrogate handler to the content sources 118 when the unresponsiveness of the one or more content sources 118 satisfies a certain condition. An example condition being satisfied is when the unresponsiveness reaches 0%. Additionally or alternatively, while not illustrated, the example rule 404A (or a different rule) may cause traffic to shift incrementally as particular unresponsiveness thresholds are met.

The example rule 404B causes the proxy server 108 to redirect a particular percentage of traffic, such as all of it at 100%, when the unresponsiveness of one or more of the content sources 118 is between a particular threshold and/or satisfies a particular condition, such as when the unresponsiveness is greater than 20%. Further, the example rule 404B causes the proxy server 108 to incrementally shift a quantity of traffic of a particular percentage or number, such as 5%, at a particular interval, such as at 10 minute intervals, from the surrogate handler to the content sources 118 when the unresponsiveness of the one or more content sources 118 satisfies a certain condition. An example condition being satisfied is when the unresponsiveness reaches 0%. Otherwise, the example rule 404B causes the proxy server 108 to shift traffic to the surrogate handler.

The example rule 404C causes the proxy server 108 to determine if the latency of retrieving a resource is greater than a particular threshold, such as greater than 2 seconds. Accordingly, if the latency condition of the rule 404C is satisfied, the proxy server 108 redirects a particular percentage of traffic, such as 20%, at a particular interval, such as at 60 second intervals, from the content sources 118 to the surrogate handler. Further, the example rule 404C causes the proxy server 108 to incrementally shift a quantity of traffic of a particular percentage or number, such as 10%, from the surrogate handler to the content sources 118 when the latency is less than a particular threshold, such as less than 1 second. In some embodiments, the traffic may be shifted at a particular interval, such as at 10 minute intervals, as one or more conditions are satisfied.

Figure 5:
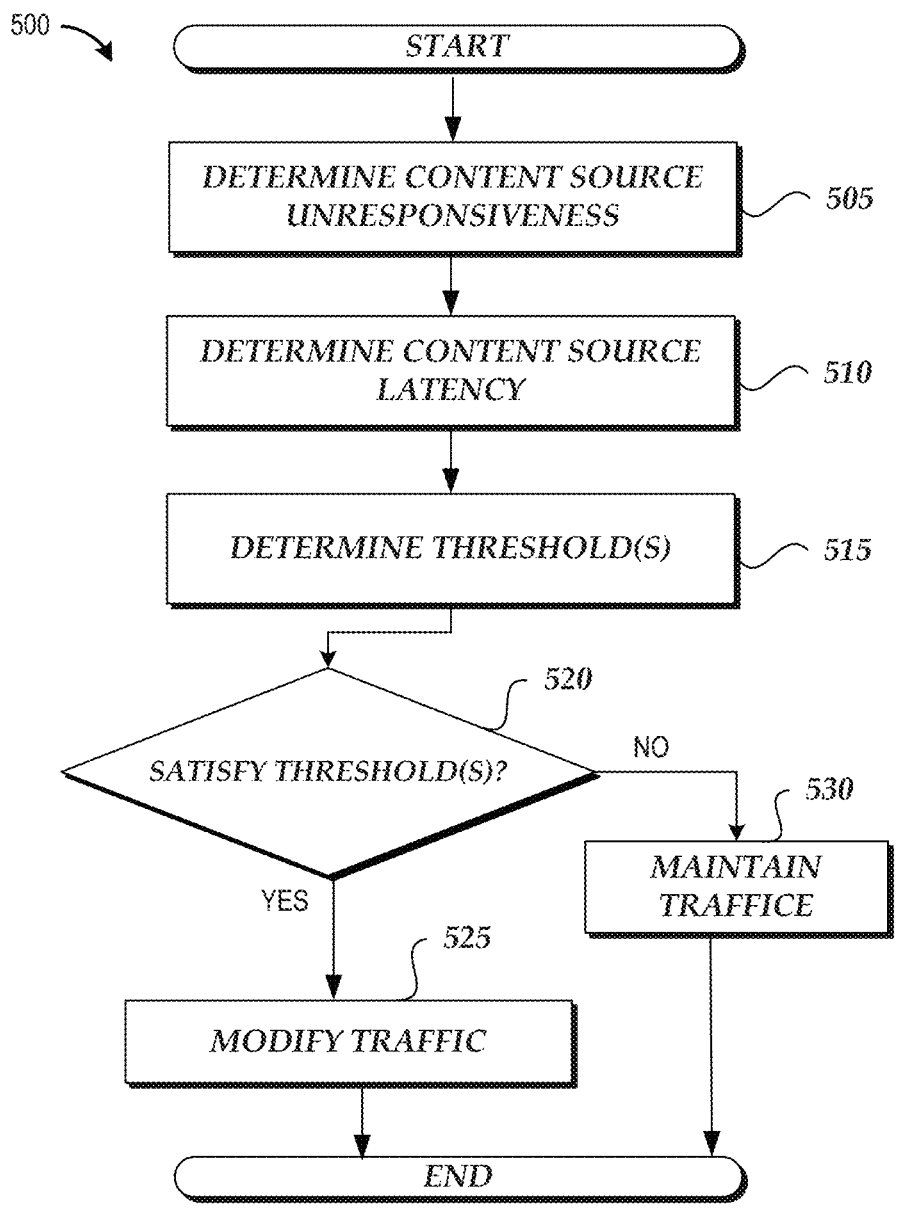
FIG. 5 is a flow diagram depicting an example method for managing resource traffic based on content source unresponsiveness and/or latency.

FIG. 5 is a flow diagram depicting an example method 500 implemented by the surrogate content service 110 for managing resource traffic based on content source unavailability and/or latency. As discussed above, in some embodiments, the proxy server 108 implements aspects of the surrogate content service 110, such as the redirect handler application 216. Thus, in some embodiments, the example proxy server 108 implements aspects of the example method 500. Depending on the embodiment, the method of FIG. 5 may include fewer or additional blocks and/or the blocks may be performed in an order that is different than illustrated. As described herein, some of the blocks of the illustrative method 500 may be similar to some blocks of the example method 300 of FIG. 3 described above, such as blocks 320, 325, and/or 340. Further, the example method 500 may be combined with one or more of the example methods described herein, such as the method 300 of FIG. 3.

The example method 500 begins at block 505, where the surrogate content service 110 and/or the proxy server 108 determines an unresponsiveness level the one or more content sources 118. An example unresponsiveness level includes a quantity and/or a percentage of a quantity of resource requests that do not receive responses or receive delayed responses from the content sources 118. Another example unresponsiveness level includes a quantity and/or a percentage of a quantity of content sources that fail network message pings.

At block 510, the surrogate content service 110 and/or the proxy server 108 determines a latency level from the one or more content sources 118. An example latency level includes the time it takes for the content sources 118 to respond to a resource request. In some embodiments, the surrogate content service 110 determines the example latency level from a statistical measure of a cumulative time regarding multiple response times, such as an average or mean time. Additionally or alternatively, the latency level includes the one-way or round-trip network transit time for resource requests and/or responses.

At block 515, the surrogate content service 110 and/or the proxy server 108 determines one or more thresholds and/or application logic for managing resource traffic. Example thresholds and/or application logic are described herein and with respect to FIG. 4. For example, the surrogate content service 110 determines thresholds with respect to unavailability (such as unresponsiveness and/or latency), such as being above or below a particular threshold value or being between two threshold values. In some embodiments, the thresholds and/or application logic are predetermined and/or accessed from storage.

In other embodiments, the surrogate content service 110 dynamically determines the thresholds and/or application logic. For example, the surrogate content service 110 can dynamically set the thresholds based on a function of the quantity of traffic and/or the failure rate for resource requests. As another example, the surrogate content service 110 can dynamically set the thresholds based on a function of the resource dependencies and/or a quantity of the respective resource dependencies that are failing, which is described in further detail herein. Further, some embodiments of the surrogate content service 110 automatically determine thresholds and/or application logic based on historical data of the quantity of traffic, the failure rate for resource requests, the resource dependencies, and/or a quantity of the respective resource dependencies that are failing. For example, the surrogate content service 110 can calculate total recovery times for different permutations of threshold parameters and select the threshold parameters with faster recovery times than others.

At block 520, the surrogate content service 110 and/or the proxy server 108 determines whether the one or more thresholds and/or the application logic is satisfied. For example, the surrogate content service 110 determines whether the unavailability level (such as the unresponsiveness level and/or the latency level) satisfy one or more thresholds. Non-limiting examples of threshold determinations include the unresponsiveness level being between a first value and the second value, the unresponsiveness level being greater than a particular value, and/or the latency level being greater than a particular value. Additional details regarding the satisfaction of one or more thresholds and/or application logic are described in further detail with respect to FIG. 4. If the surrogate content service 110 and/or the proxy server 108 determines that the one or more thresholds and/or the application logic is satisfied, then the service or server proceeds to block 525. Otherwise, the service or server proceeds to block 530.

At block 525, the surrogate content service 110 and/or the proxy server 108 modifies the traffic based on the accessed and/or determined application logic. For example, the surrogate content service 110 can redirect a single resource request to a surrogate handler (away from the one or more content sources 118) that returns a backup resource from the content data store 114. Additional examples of modification of traffic include redirecting a quantity of traffic away from the one or more content sources 118 based on the threshold and/or application logic that was satisfied. Continuing with the example, where the unresponsiveness level is between a particular threshold, such as greater than 5% and less than 10%, then the surrogate content service 110 redirects a particular quantity of resource traffic, such as 50% of the resource traffic, to the surrogate handler and/or away from the one or more content sources 118. In another example, where the unresponsiveness level is greater than a particular threshold, such as greater than 20%, the surrogate content service 110 redirects a particular quantity of the resource traffic, such as 100% of the resource traffic, to the surrogate handler and/or away from the one or more content sources 118. As another example, if the latency level is greater than a particular threshold, such as greater than two seconds, the surrogate content service 110 redirects a particular percentage of traffic, such as 20%, at a particular interval, such as at 60 second intervals, to the surrogate handler and/or away from the one or more content sources 118. Additional details regarding the modification of traffic are described in further detail with respect to FIG. 4.

In some embodiments, the surrogate content service 110 implements the redirection of traffic using an elapsed time. For example, the surrogate content service 110 may store and/or keep track of a first time when a quantity of traffic was redirected. The surrogate content service 110 may determine an elapsed time from the first time, such as 60 seconds, 10 minutes, or 1 hour, for example. Accordingly, a second quantity of traffic may be redirected after the elapsed time. For example, the example rule 404C of FIG. 4 may indicate that a first quantity of traffic, such as 20%, is redirected at a first time, then after an elapsed time, if the error condition is still satisfied, a second quantity greater than the first quantity of traffic is redirected, such as 40%, at a second time. In some embodiments, the example rule may execute until all of the traffic is redirected or some other condition is satisfied, such as a reduction in unresponsiveness and/or latency.

In some embodiments, on subsequent iterations of some or all of the blocks of the method 500, as the surrogate content service 110 determines updated levels of unavailability, such as unresponsiveness and/or latency, the surrogate content service 110 may further modify the traffic. For example, when the unavailability level satisfies a particular threshold, such as unresponsiveness being at 0%, then the surrogate content service 110 may cause traffic to be directed to the content sources 118. As another example, when the unavailability level satisfies a particular threshold, such as unresponsiveness being at 0%, then the surrogate content service 110 incrementally directs a quantity of traffic of a particular percentage or number, such as 5%, at a particular interval, such as at 10 minute intervals, back to the content sources 118. As another example, when the latency is less than a particular threshold, such as less than 1 second, the surrogate content service 110 incrementally directs a shift a quantity of traffic of a particular percentage or number, such as 10%, back to the content sources 118.

At block 530, the surrogate content service 110 and/or the proxy server 108 maintains traffic. For example, where the one or more thresholds and/or the application logic is not satisfied, the status quo of traffic may be maintained. Continuing with the example, if there were no unavailability issues, then the surrogate content service 110 and/or the proxy server 108 continue to forward traffic to the content sources 118. However, where traffic has been previously modified, so long as the unavailability issues continue, the surrogate content service 110 and/or the proxy server 108 may continue to forward traffic to the surrogate handler that may potentially result in backup resources being returned to client devices until the content sources 118 recover. As described herein, while not illustrated, the example method 500 may proceed in an iterative manner to process some or all of the blocks of the example method 500 continuously to either detect unavailability issues and/or to facilitate recovery from unavailability issues.

Figure 6:
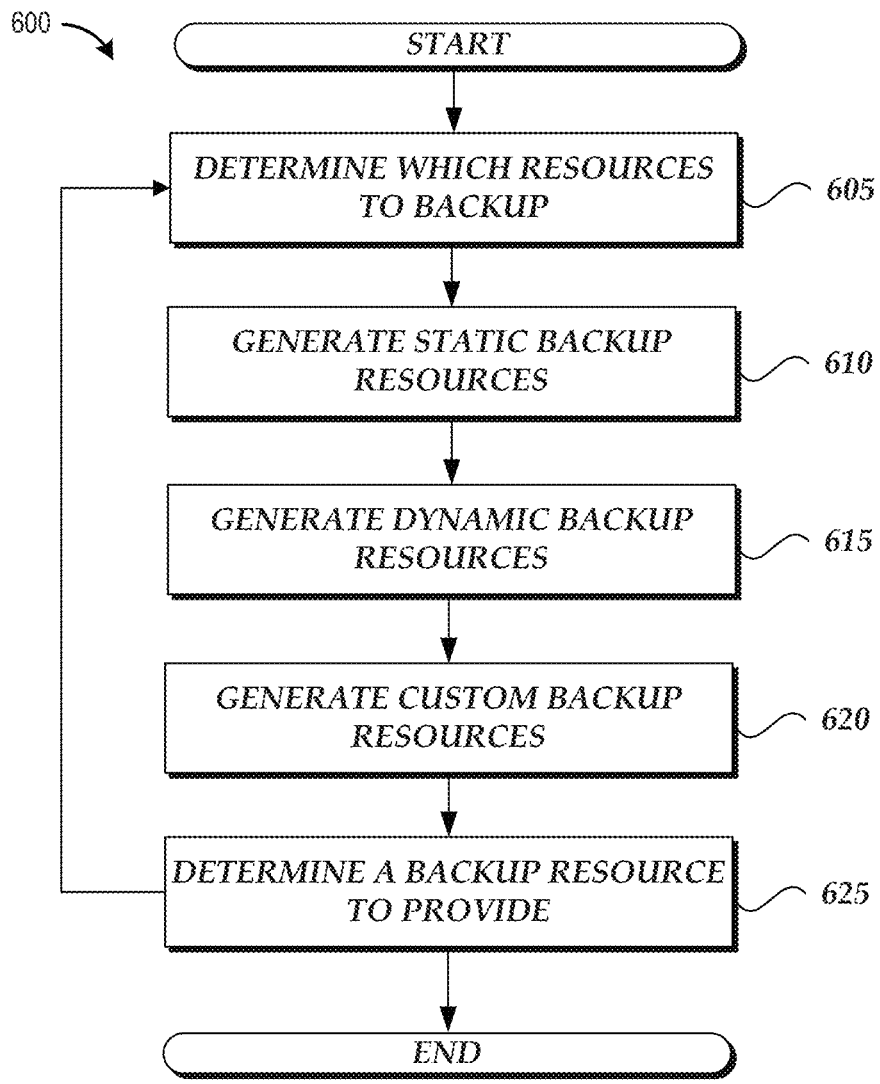
FIG. 6 is a flow diagram depicting an example method for generating and/or serving backup resources.

FIG. 6 is a flow diagram depicting an example method 600 implemented by the surrogate content service 110 for generating and/or serving backup resources. As discussed above, in some embodiments, the backup content generator 104 implements aspects of the surrogate content service 110, such as the backup content application 222. Likewise, in some embodiments, the proxy server 108 implements aspects of the surrogate content service 110, such as the redirect handler application 216. Thus, in some embodiments, the example backup content generator 104 and/or the example proxy server 108 implement aspects of the example method 600. Depending on the embodiment, the method of FIG. 6 may include fewer or additional blocks and/or the blocks may be performed in an order that is different than illustrated. As described herein, some of the blocks of the illustrative method 500 may be similar to some blocks of the example method 300 of FIG. 3 described above, such as blocks 305, 310, 320, and/or 340. Further, the example method 600 may be combined with one or more of the example methods described herein, such as the method 300 of FIG. 3. In some embodiments, some of the blocks of the example method 600 are advantageously executed continuously in the background. Further, some of the blocks of the example method 600 may execute before the content sources 118 and/or particular resources are live, such that if there are unavailability issues early, there will be sufficient backup resources and/or a cold start problem will be avoided.

The example method 600 begins at block 605, where the surrogate content service 110 and/or the proxy server 108 determines the resources where a corresponding backup resource should be generated. For example, the surrogate content service 110 selects a resource identifier to back up from multiple resource identifiers. Continuing with the example, the surrogate content service 110 determines frequently accessed and/or requested resources. In the example, the proxy server 108 and/or an analytics services maintains request analytics data regarding frequently accessed and/or requested resources. Accordingly, the example surrogate content service 110 determines one or more frequently requested resource identifiers from the request analytics data. Thus, when the content sources 118 experience unavailability issues, the surrogate content service 110 can provide backup resources for frequently accessed and/or requested resources, such as the most popular 100 network pages or user interfaces, for example. In the proceeding description of blocks 605, 610, and 615, backup resources are generated from the identified resources.

In other embodiments, the surrogate content service 110 may process all resources or may employ other methods for selecting which resources to process. For example, certain priority resources may be identified and/or tagged by an administrator for processing. Example priority resources include a resource where it is known that even before the resource is available to be requested by client devices that there will likely be a high volume of requests for the resource, such as a resource regarding a product launch where it is anticipated that there will be tens or hundreds of thousands of resource requests that will possibly cause unavailability issues.

At block 610, the surrogate content service 110 and/or the backup content generator 104 generates backup resources for one or more static resources. The example surrogate content service 110 generates a backup resource for a static resource by copying it. An example static resource is not dependent on dynamic generation by a service, such as a static HTML page. The surrogate content service 110 copies the generated backup resource to the content data store 114.

At block 615, the surrogate content service 110 and/or the backup content generator 104 generates backup resources for one or more dynamic resources. An example dynamic resource is dependent on dynamic generation by one or more services, which may be multi-dependent. In some embodiments, the surrogate content service 110 may copy a final version of a dynamically generated resource as the backup resource. Further, the surrogate content service 110 may periodically take final versions of dynamic resources at certain intervals. Additionally or alternatively, the surrogate content service 110 may include application logic to invoke the content generation methods of the content sources 118 to generate the backup resource. As described herein, in some embodiments, the surrogate content service 110 identifies resources that include user-customized content and removes the user-customized content so that the backup version of the resource can be provided to multiple users.

At block 620, the surrogate content service 110 and/or the backup content generator 104 generates custom backup resources. For example, certain special resources may only be generated if one or more services are available, such as a resource generated by multi-dependent services. Such an example resource includes a credit card payment network page. In some embodiments, the surrogate content service 110 identifies special resources by a tag or identifier associated with the resource. Additionally or alternatively, the surrogate content service 110 identifies special resources dynamically by determining if one or more services are unavailable for a particular resource. Accordingly, the surrogate content service 110 may generate and/or cause presentation of a custom backup resource. In the example, the custom resource may include content or items that the requesting user may be interested in, such as commonly requested items or content. Continuing with the example, custom backup resource includes content such as: "We are experiencing the load on the website, until we recover you may be interested in the following content." As another example, if the resource unavailability occurs during a customer checkout, the custom resource may similarly include content that the user may be interested and include content such as: "Customers who also bought this item have also bought these similar products." The surrogate content service 110 may provide custom backup resources until the content sources 118 recover and/or some other condition is satisfied (such as expiration of a time to live). Some advantages of this approach include ensuring user engagement during unavailability, which further reduces the load on dependencies that leads to faster recovery.

In some embodiments, the surrogate content service 110 generates the custom backup resource based on parameterized data. For example, the surrogate content service 110 may determine and/or segment requests based on data, such as where the request came from and/or parameter data within the request. Continuing with the example, the resource requests may indicate an originating geographic region and the generated custom backup resource may be customized to the geographic region. For example, the surrogate content service 110 may generate a custom backup resource associated with New York products if the request originated from the greater New York region. An example resource request may include parameters, such as search and/or URI parameters. Accordingly, the surrogate content service 110 may include custom logic to respond to resource requests that include parameters, such as search and/or URI parameters. For example, if a search service is down, the surrogate content service 110 may include a backup search engine with search data from the content data store 114 to respond to search requests.

At block 625, the surrogate content service 110 and/or the proxy server 108 determines whether and/or which backup resource to provide. For example, as described herein, a resource request may include a resource identifier. The example surrogate content service 110 determines a corresponding backup resource from the resource identifier. The example backup resource corresponding to a static, dynamic, and/or a custom backup resource. Further, as described herein, the example surrogate content service 110 determines whether to provide a backup resource based on a staleness indicator, such as a time to live. In some embodiments, the time to live value may be specified for a particular backup resource and/or for a group of backup resources. For example, different types of backup resources may have different time to live values. Further, some example custom resources, such as a deals page that changes hourly, may have a custom time to live value, such as one hour.

In some embodiments, the surrogate content service 110 can determine whether to redirect traffic and/or provide backup resources based on network codes. Example network codes include HTTP status codes. The example surrogate content service 110 includes application logic to determine unavailability based on the network codes. Continuing with the example, the surrogate content service 110 can determine that a message contains a status code indicating a client error (such as a HTTP 400 Bad Request code) and may not treat the message as indicating that a content source is unavailable thereby avoiding a false positive. Additionally or alternatively, the surrogate content service 110 can determine that a message contains a status code indicating a server error (such as a HTTP 504 Gateway Timeout code) and may redirect traffic accordingly and/or may cause a backup resource to be provided.

As described herein, the surrogate content service 110 can further manage resource request based on graph dependencies. For example, the surrogate content service 110 can determine to redirect or direct traffic based on a dependency graph of service dependencies. Continuing with the example, more traffic can be shifted to backup resources where a particular dependency graph includes more failures relative to a different dependency graph that has fewer failures. In the example, if a dependency graph has five failures then more traffic can be shifted to backup resources for the five-failure graph and less traffic can be shifted for a dependency graph with a single failure in the graph. In some embodiments, the surrogate content service 110 dynamically shifts traffic based on graph dependencies, as described herein. Additional information regarding graph dependencies are described in further detail with respect to FIGS. 7 and/or 8.

Figure 7:
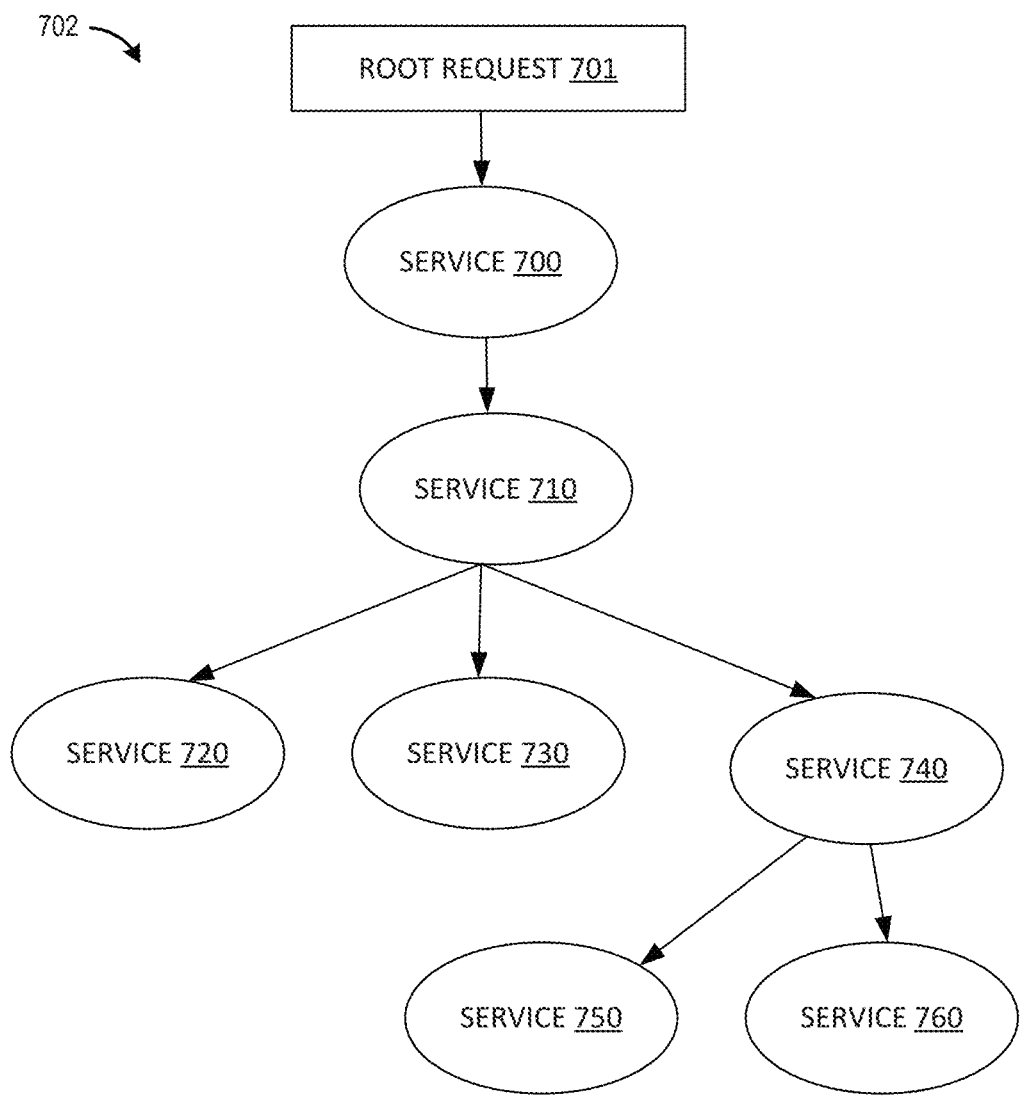
FIG. 7 is a pictorial diagram depicting an example service dependency graph.

FIG. 7 depicts an example service dependency graph. In the context of a service-oriented architecture, to process a given received request, the surrogate content service 110 may invoke one or more of the types of services described above. As used herein, and in addition to having its ordinary meaning, an initial request may be referred to as the "root request." In some embodiments, the root request may but need not originate from a computer system outside of the service oriented system described herein. In many embodiments, a root request may be processed by an initial service, which may then call one or more other services. Additionally, each of those services may also call one or more other services (and so on until the root request is completely fulfilled). Accordingly, the particular services called to fulfill a request may be represented as a "call tree" hierarchy that specifies, for each particular service of multiple services called to fulfill the same root request, the service that called the particular service and any services called by the particular service. As used herein, and in addition to their ordinary meanings, the terms "call tree hierarchy," "call tree," "service graph," and "graph dependency," may be used interchangeably. An example call tree hierarchy may in some cases be a deep and broad tree with multiple branches each representing a series of related service calls. Additional details regarding graph dependencies and their use are described in further detail in U.S. Pat. No. 9,391,825, titled "SYSTEM AND METHOD FOR TRACKING SERVICE RESULTS," which is hereby incorporated by reference in its entirety.

Various terms may be useful for describing elements of a call tree hierarchy. Note that the following terminology may only be applicable to services and requests of a given call tree hierarchy. In other words, the following terminology may only be applicable for services and requests associated with the same root request. From the perspective of a particular service, any service that calls the particular service may be referred to as a "parent service." Furthermore, from the perspective of a particular service, any service that the particular service calls may be referred to as a "child service." In a similar fashion, from the perspective of a particular request, any request from which the particular request stems may be referred to as a "parent request." Furthermore, from the perspective of a particular request, any request stemming from the particular request may be referred to as a "child request." Additionally, as used herein the phrases "call request," "service request" and "service call" may be used interchangeably. Note that this terminology refers to the nature of the propagation of a particular request throughout the present system and is not intended to limit the physical configuration of the services. As may sometimes be the case with service-oriented architectures employing modularity, each service may in some embodiments be independent of other services in the service-oriented system (e.g., the source code of services or their underlying components may be configured such that inter-dependencies among source and/or machine code are not present).

As described above, a given parent request may result in multiple child service calls to other services. In some embodiments of the system and method for tracking service requests, call request identifiers embedded within such service calls (or located elsewhere) may be utilized to generate a stored representation of a call tree hierarchy for a given request. In some embodiments, such call request identifiers may be stored in log files associated with various services. For instance, a service may store identifiers for inbound requests in an inbound request log and/or store identifiers for outbound requests in an outbound request log. In some embodiments, the surrogate content service 110 may generate a representation of a call tree hierarchy from identifiers retrieved from such logs. Such representations may be utilized for diagnosing errors with request handling, providing developer support, and performing traffic analysis.

An origin identifier may be an identifier assigned to all call requests of a given call tree hierarchy, which includes the initial root request as well as subsequent requests spawned as a result of the initial root request. For example, as described above, the service-oriented systems of various embodiments may be configured to process requests from various internal or external systems, such as client computer systems or computer systems consuming networked-based services. To fulfill one of such call requests, the service-oriented system may call multiple different services. For instance, service "A" may be the initial service called to fulfill a request (e.g., service "A" may be called by an external system). To fulfill the initial request, service "A" may call service "B," which may call service "C," and so on. Each of such services may perform a particular function or quantum of work in order to fulfill the initial request. In some embodiments, each of such services may be configured to embed the same origin identifier into a request of (or call to) another service. Accordingly, each of such requests may be associated with each other by virtue of containing the same origin identifier. As described in more detail below, the call tree generation logic of various embodiments may be configured to determine that request identifiers having the same origin identifier are members of the same call tree hierarchy.

FIG. 7 illustrates a visual representation of an example call tree data structure. The example data environment 700 includes a root request 701 that causes the surrogate content service 110 to invoke a first service 700. As illustrated, the example data environment includes the other dependent services 710, 720, 730, 740, 750, and 760. In some embodiments, a call tree data structure may include any data structure that specifies, for a given root request, all the services called to fulfill that root request. Note that while FIG. 7 and the associated description pertain to an acyclic call tree, this representation is not inclusive of all variations possible for such a call tree. For instance, in other embodiments, a call tree may be represented by any directed graph (including graphs that include directed cycles) dependent on the nature of the service requests within the service-oriented system. Additionally, for a given one of such services, the call tree data structure may specify the service that called the given service as well as any services called by the given service. The call tree data structure may additionally indicate a hierarchy level of a particular service within a call tree. For instance, in the illustrated embodiment, service 700 is illustrated as a part of the first level of the hierarchy, service 710 is illustrated as part of the second level of the hierarchy and so on.

To generate such a call tree, the surrogate content service 110 may be configured to collect call request identifiers that each include the same origin identifier. In some embodiments, the surrogate content service 110 may mine (e.g., perform a search or other data analysis) log data associated with various services in order to find a collection of request identifiers that correspond to the same origin identifier (and thus correspond to the same root request, e.g., root request 701).

In some embodiments, inbound and outbound request logs may be maintained for each service. In these cases, the surrogate content service 110 may be configured to compare call request identifiers in order to determine that a given service called another service in the process of fulfilling the root request. For example, in one embodiment, the surrogate content service 110 may compare a call request identifier from a given service's outbound request log to the call request identifier from another service's inbound request log. If a match is detected, the surrogate content service 110 may indicate that the service corresponding to that outbound request log called the service corresponding to that inbound request log. For example, the surrogate content service 110 may discover a call request identifier equivalent to a call request identifier within the outbound request log associated with service 700. In this example, the surrogate content service 110 may also locate a call request identifier equivalent to the call request identifier within the inbound log of service. In response to this match, the surrogate content service 110 may indicate that an edge (representing a service call) exists between two particular nodes of the call tree (e.g., the node corresponding to service 700 and the node corresponding to service 510). The above described process may be repeated to determine the illustrated edges that correspond to additional call request identifiers. In other embodiments, since the manner in which interaction identifiers are generated may ensure that each interaction identifier is unique for a given depth level and origin identifier, the surrogate content service 110 may instead search for matching interaction identifiers between call request identifiers of adjacent depth levels instead of searching for matching call request identifiers.

In other embodiments, only one type of log (e.g., either inbound or outbound) may be maintained for a given service. For example, if only outbound request logs are maintained for each of the services, then the surrogate content service 110 may utilize different techniques for determining an edge that represents a service call in the call tree data structure. In one example, the surrogate content service 110 may compare two call request identifiers that have adjacent depth values. For instance, the surrogate content service 110 may be configured to compare a first call request identifier to a second call request identifier, since such call request identifiers contain the adjacent depth values of 1 and 2.

In some embodiments, the surrogate content service 110 may be configured to generate a call tree in the presence of data loss. For instance, consider the case where the service oriented system maintains outbound service logs and the log data for service 710 is lost, as might be the case in the event of a failure on the host system on which service 710 runs or in the case of a failure of a log repository. Since the call request identifiers of various embodiments may include a request stack of multiple interaction identifiers, multiple layers of redundancy may be utilized to overcome a log data loss. In this example, since the outbound log data for service 710 is lost the corresponding call request identifiers. Accordingly, the surrogate content service 110 may be configured to utilize a call request identifier from a lower depth level to reconstruct the pertinent portion of the call tree. While some call request identifiers may not be available due to data loss, another call request may be available. Since the available call request identifier includes a stack or "history" of interaction identifiers, the call request identifier may be utilized to obtain information that would have been available if the call request identifier was not lost to data failure.

Various metadata may also be included within such call tree data structure, such as timestamps, the particular quantum of work performed in response to a given request, and/or any errors encountered while processing a given request. For example, the illustrated services may record timestamps of when a request is received, when a request is generated, and/or when a request is sent to another service. These timestamps may be appended to the call tree data structure to designate latency times between services (e.g., by calculating the time difference between when a request is sent and when it is received). In other cases, metadata may include error information that indicates any errors encountered or any tasks performed while processing a given request. In some embodiments, such metadata may include host address (e.g., an Internet Protocol address of a host) in order to generate a tree structure that indicates which host machines are processing requests (note that in some embodiments host machines may host multiple different services).

Figure 8A:
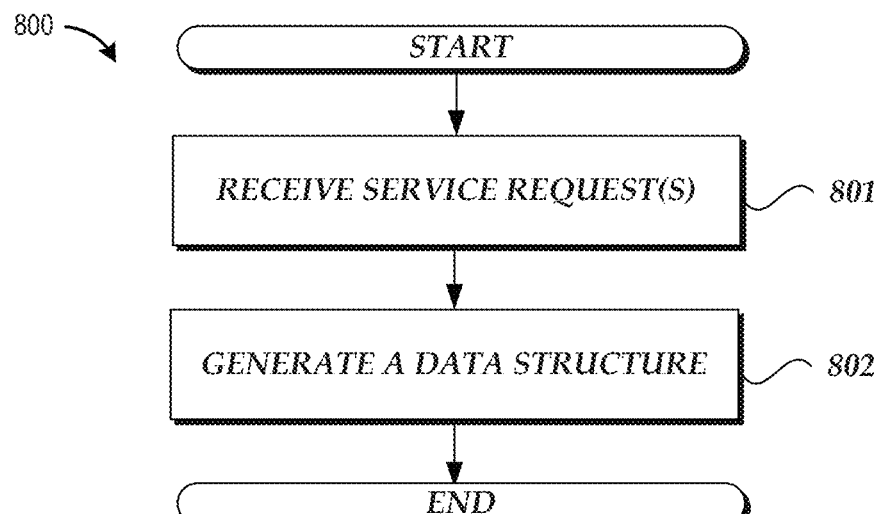
FIGS. 8A and 8B are flow diagrams depicting example methods for determining a service dependency graph.
Figure 8B:
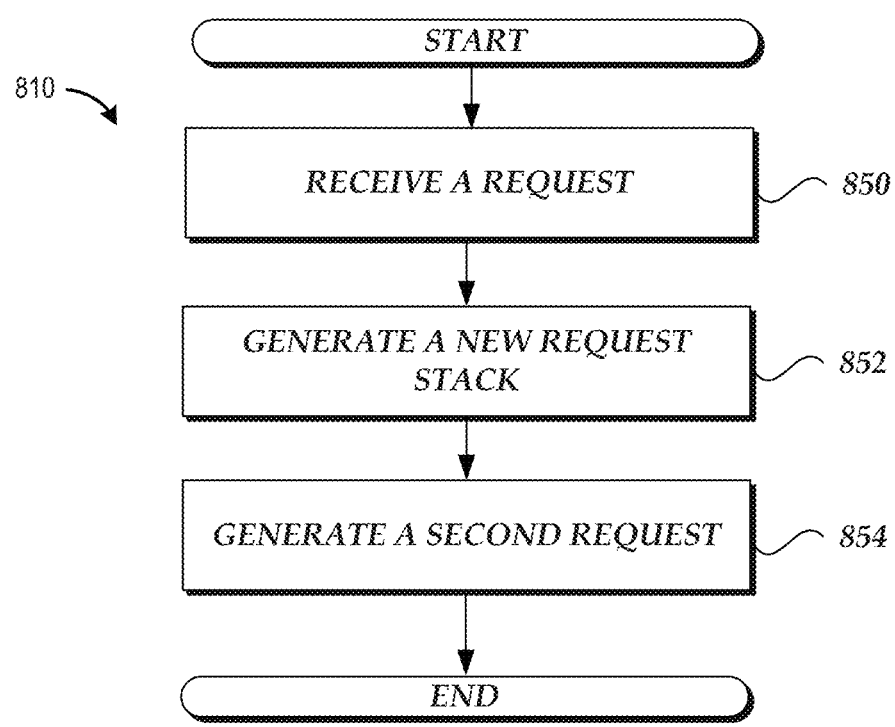

FIGS. 8A and 8B are flow diagrams depicting example methods 800 and 810 implemented by the surrogate content service 110 for managing service dependencies. Depending on the embodiment, the methods of FIGS. 8A and 8B may include fewer or additional blocks and/or the blocks may be performed in an order that is different than illustrated.

As illustrated, the example method 800 may begin with block 801, which may include receiving multiple call request identifiers each associated with a respective one of multiple service requests. Each given call request identifier may include an origin identifier associated with a root request, a depth value specifying a location of the associated service request within a sequence of service requests, and a request stack including one or more interaction identifiers assigned to a service request issued from one service to another service. For example, receiving multiple call request identifiers may in some cases include receiving log data that includes such call request identifiers. For instance, the method 800 may include receiving log data directly from host systems that host the services of the service-oriented system described herein. In some cases, the method may include receiving log data from one or more log repositories such as a log repository.

At block 802, the method 800 may further include, based on multiple ones of the call request identifiers that each include an origin identifier associated with a particular root request, generating a data structure that specifies a hierarchy of services called to fulfill that particular root request; wherein, based on one or more of the interaction identifiers and one or more of the depth values, the generated data structure specifies, for a given service of said hierarchy: a parent service that called the given service, and one or more child services called by the given service. For example, in some embodiments, generating the data structure may include determining that each of a subset of the multiple call request identifiers includes the same origin identifier as well as indicating each associated service request as a node of the hierarchy within the data structure. Examples of such nodes are illustrated in FIG. 7 as services 700, 710, 720, 730, 740, 750, and 760. Generating such a data structure may also include, for each node within the hierarchy, assigning the node to a level within the hierarchy based on the transaction depth value of the call request identifier associated with the service request corresponding to that node. Generating the data structure may also include determining that the request stack of a given node at a given level within the hierarchy includes an interaction identifier that is the same as an interaction identifier of the request stack of another node located within an adjacent level of the hierarchy. In response to determining such a match, the method may include indicating a service call as an edge between the given node and the other node. Examples of such an edge are illustrated as the edges coupling the nodes of FIG. 7 described above.

In some embodiments, the techniques for analyzing call request identifiers and generating a call tree may be performed on an incremental basis. For example, as call request identifiers are updated (e.g., as logs and/or log repositories receive new data), the call tree generation logic described herein may be configured to incrementally update the generated call tree data structure to reflect the newly reported requests. In some embodiments, the techniques described herein may be performed on a depth level basis. For example, as call request identifiers are received (e.g., by the log repository or call tree generation logic described herein), each identifier may be categorized (e.g., placed in a categorized directory) based on transaction depth.

In some embodiments, the generated call tree data structures described herein may be utilized for determining service unavailability and/or diagnostic purposes. For instance, as described above, the call tree data structure may include metadata, such as a record of error(s) that occur when processing a request. Since this metadata may be associated with specific nodes and/or service calls, various embodiments may include determining sources of errors or faults within the service oriented system. In some embodiments, the generated call tree data structures described herein may be utilized for analytical purposes. For example, based on call tree data structures generated as described herein, various embodiments may include determining historical paths of service calls and/or path anomalies. For instance, various embodiments may include detecting that, for a given root request, one or more services are being called unnecessarily. For instance, such services may not be needed to fulfill the particular root request. Accordingly, in some embodiments, such services may be culled from processing further requests similar to or the same as the root request that originally initiated the unnecessary service calls (e.g., a re-orchestration process may be employed to modify the particular services called for a particular type of request). By removing such unnecessary service calls, various embodiments may conserve resources such as storage and/or bandwidth. In other embodiments, the generated call tree data structures described herein may be utilized for auditing purposes. For example, in the case that the service oriented system provides network-based services (e.g., network services) to consumers of such services (who may provide remuneration for the consumption of services), such consumers may desire to at least occasionally view information that confirms they are being charged in a fair manner. To provide such information to the consumer, various embodiments may include providing the consumer with various records such as records that indicate how frequent they consume network-based services and in what quantity. Such information may be generated based on the call tree data structures described herein.

FIG. 8B illustrates a flowchart of the example method 810 for generating a given call request identifier. At block 850, the method may include receiving a first call request identifier associated with an inbound service request. The call request identifier may include an origin identifier associated with a root request, a depth value specifying a location of the inbound service request within a sequence of service requests, and a request stack including multiple interaction identifiers each assigned to a respective service request issued from one service to another service of multiple services.

At block 852, the method 810 may also include generating a new request stack. The new request stack may include all of the interaction identifiers of the first call request identifier except for an oldest one of the interaction identifiers. The new request stack may also include a new interaction identifier associated with an outbound service request.

At block 854, the method may also include generating a second call request identifier associated with the outbound service request. The second call request identifier may include the origin identifier, a new depth value specifying a location of the outbound service request within the sequence of service requests, and the new request stack.

In some embodiments, the method may also include generating the new depth value such that the new depth value is a result of incrementing the first depth value. In some embodiments, the method may include storing either of (or both of) the first call request identifier and the second call request identifier as log data accessible to one or more computer systems.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Further, the term "each", as used herein, in addition to having its ordinary meaning, can mean any subset of a set of elements to which the term "each" is applied.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method for providing network content during server unavailability, the computer-implemented method comprising:
    under control of a computer hardware processor configured with specific computer-executable instructions,
        generating, from a first content source, a backup content page for a first content page, wherein generating the backup content page further comprises:
            requesting, from a service, the first content page, wherein the service dynamically creates the first content page; and
            copying the first content page as the backup content page, wherein the backup content page comprises dynamically created static content;
        storing the backup content page with a time to live value;
        receiving, from a first device, a first request for the first content page;
        determining an unresponsiveness level for the first content source;
        determining a latency level for the first content source;
        determining that at least one of the unresponsiveness level or the latency level satisfies a threshold and that a current time is within the time to live value;
        providing the backup content page to the first device;
        receiving, from a second device, a second request for a second content page;
        identifying a second content source associated with the second request;
        determining that the second content source is available;
        retrieving, from the second content source, the second content page; and
        providing the second content page to the second device.

2. The computer-implemented method of claim 1, further comprising:
    receiving one or more first additional resource requests; and
    redirecting a first quantity of the one or more first additional resource requests away from the first content source.

3. The computer-implemented method of claim 2, further comprising:
    receiving one or more second additional resource requests;
    determining an updated unresponsiveness level for the first content source;
    determining that the updated unresponsiveness level satisfies a different threshold; and
    directing a second quantity of the one or more second additional resource requests back to the first content source.

4. The computer-implemented method of claim 3, wherein the updated unresponsiveness level comprises zero.

5. The computer-implemented method of claim 2, further comprising:
    receiving one or more second additional resource requests;
    determining an updated latency level for the first content source;
    determining that the updated latency level satisfies a different threshold; and
    directing a second quantity of the one or more second additional resource requests back to the first content source.

6. The computer-implemented method of claim 2, wherein redirecting the first quantity occurs at a first time, and further comprising:
    determining an elapsed time from the first time; and
    redirecting, after the elapsed time, a second quantity of one or more second additional resource requests away from the first content source.

7. A non-transitory computer-readable storage medium storing computer executable instructions that when executed by a computer hardware processor perform operations comprising:
    generating, from a content source, a backup content page for a first content page, wherein generating the backup content page further comprises:
        requesting, from a service, the first content page, wherein the service dynamically creates the first content page; and
        copying the first content page as the backup content page, wherein the backup content page comprises dynamically created static content;
    receiving, from a first device, a request for the first content page;
    identifying the content source associated with the request;
    determining an unavailability level for the content source;
    determining that the unavailability level satisfies a threshold;
    identifying the backup content page corresponding to the first content page;
    determining that the backup content page is valid; and
    providing the backup content page to the first device.

8. The non-transitory computer-readable storage medium of claim 7, wherein the operations further comprise:
storing, in second non-transitory computer-readable storage, the backup content page.

9. The non-transitory computer-readable storage medium of claim 7, wherein the operations further comprise:
determining to backup the first content page, wherein determining to backup the first content page further comprises:
retrieving request analytics data corresponding to at least some of a plurality of resource identifiers;
identifying, from the request analytics data, a first resource identifier as a frequently requested resource identifier, the first resource identifier corresponding to the first content page; and
selecting, from the plurality of resource identifiers, the first resource identifier.

10. The non-transitory computer-readable storage medium of claim 7, wherein the unavailability level comprises at least one of unresponsiveness or latency of the content source.

11. The non-transitory computer-readable storage medium of claim 7, wherein the operations further comprise:
receiving one or more first additional resource requests; and
redirecting a first quantity of the one or more first additional resource requests away from the content source.

12. The non-transitory computer-readable storage medium of claim 11, wherein redirecting the first quantity occurs at a first time, and wherein the operations further comprise:
determining an elapsed time from the first time; and
redirecting, after the elapsed time, a second quantity of one or more second additional resource requests away from the content source.

13. The non-transitory computer-readable storage medium of claim 11, wherein the operations further comprise:
receiving one or more second additional resource requests;
determining an updated unavailability level for the content source;
determining that the updated unavailability level satisfies a different threshold; and
directing a second quantity of the one or more second additional resource requests back to the content source.

14. A system for providing network content during server unavailability, the system comprising:
an electronic data store; and
a first computing device comprising a computer hardware processor that executes specific computer-executable instructions to cause the system to at least:
generate, from a content source, a backup content page for a first content page, wherein to generate the backup content page further comprises:
request, from a service, the first content page, wherein the service dynamically creates the first content page; and
copy the first content page as the backup content page, wherein the backup content page comprises dynamically created static content;
store, in the electronic data store, the backup content page with a staleness indicator;
receive, from a first device, a request for the first content page;
determine an indication that the first content page is unavailable and that the backup content page is valid based on the staleness indicator; and
provide the backup to the first device.

15. The system of claim 14, wherein the first computing device is further configured to at least:
retrieve request analytics data corresponding to at least a plurality of resource identifiers; and
identify, from the request analytics data, a first resource identifier as a frequently requested resource identifier, the first resource identifier corresponding to the first content page.

16. The system of claim 14, wherein determining the indication that the first content page is unavailable further comprises:
determining an unavailability level for the content source; and
determining that the unavailability level satisfies a threshold.

17. The system of claim 16, wherein the unavailability level comprises at least one of unresponsiveness or latency of the content source.

18. The system of claim 16, wherein the first computing device is further configured to at least:
receive one or more first additional resource requests; and
redirect a first quantity of the one or more first additional resource requests away from the content source.

19. The system of claim 18, wherein redirecting the first quantity occurs at a first time, and wherein the first computing device is further configured to at least:
determine an elapsed time from the first time; and
redirect, after the elapsed time, a second quantity of one or more second additional resource requests away from the content source.

20. The system of claim 18, wherein the first computing device is further configured to at least:
receive one or more second additional resource requests;
determine an updated unavailability level for the content source; and
direct a second quantity of the one or more second additional resource requests back to the content source.

* * * * *